(12) United States Patent
Mock

(10) Patent No.: US 9,445,133 B2
(45) Date of Patent: Sep. 13, 2016

(54) DVD CONVERSION FOR ON DEMAND

(75) Inventor: Wayne E. Mock, Round Rock, TX (US)

(73) Assignee: ARRIS Enterprises, Inc., Suwanee, GA (US)

( * ) Notice: Subject to any disclaimer, the term of this patent is extended or adjusted under 35 U.S.C. 154(b) by 4075 days.

(21) Appl. No.: 10/615,702

(22) Filed: Jul. 9, 2003

(65) Prior Publication Data

US 2004/0136698 A1  Jul. 15, 2004

Related U.S. Application Data

(60) Provisional application No. 60/395,505, filed on Jul. 11, 2002, provisional application No. 60/395,136, filed on Jul. 10, 2002.

(51) Int. Cl.
| | |
|---|---|
| *H04N 21/218* | (2011.01) |
| *G11B 27/034* | (2006.01) |
| *G11B 27/10* | (2006.01) |
| *H04N 5/85* | (2006.01) |
| *H04N 21/231* | (2011.01) |
| *H04N 21/232* | (2011.01) |
| *H04N 21/2343* | (2011.01) |
| *H04N 21/2381* | (2011.01) |
| *H04N 21/2668* | (2011.01) |
| *H04N 21/472* | (2011.01) |
| *H04N 21/658* | (2011.01) |
| *H04N 5/44* | (2011.01) |
| *H04N 21/431* | (2011.01) |
| *H04N 21/462* | (2011.01) |
| *H04N 21/47* | (2011.01) |

(52) U.S. Cl.
CPC ....... *H04N 21/21825* (2013.01); *G11B 27/034* (2013.01); *G11B 27/105* (2013.01); *H04N 5/85* (2013.01); *H04N 21/232* (2013.01); *H04N 21/2343* (2013.01); *H04N 21/2381* (2013.01); *H04N 21/23113* (2013.01); *H04N 21/2668* (2013.01); *H04N 21/47202* (2013.01); *H04N 21/6581* (2013.01); *G11B 2220/2562* (2013.01); *H04N 5/4401* (2013.01); *H04N 21/4316* (2013.01); *H04N 21/4622* (2013.01); *H04N 21/47* (2013.01)

(58) Field of Classification Search
CPC ................. G11B 2220/2562; G11B 27/034; G11B 27/105; H04N 21/21825; H04N 21/23113; H04N 21/232; H04N 21/2343; H04N 21/2381; H04N 21/2668; H04N 21/4316; H04N 21/4622; H04N 21/47; H04N 27/47202
USPC .................. 386/1, 46, 94, 125, 126; 725/87
See application file for complete search history.

(56) References Cited

U.S. PATENT DOCUMENTS

| | | | |
|---|---|---|---|
| 5,966,120 A * | 10/1999 | Arazi et al. .................... 715/724 |
| 6,324,544 B1 * | 11/2001 | Alam et al. | |
| 6,341,375 B1 * | 1/2002 | Watkins ........................ 725/100 |
| 6,407,680 B1 * | 6/2002 | Lai et al. ........................ 341/50 |

(Continued)

*Primary Examiner* — Gelek W Topgyal
(74) *Attorney, Agent, or Firm* — Stewart M. Wiener

(57) ABSTRACT

A method for pruning and grooming DVD content into a format compatible to be viewed over a network is disclosed. The method provides for automated DVD conversion. The method provides for removing and editing DVD content that is not desirable to be delivered over the network and adding and editing additional content that is desirable to be delivered over the network. The method provides for navigational enhancement that provide: tie-ins to on demand portals; key-mapping; button highlighting; intra-menu navigation; inter-menu navigation and DVD disc merge capability.

14 Claims, 27 Drawing Sheets

Content Center Tools and Architecture

(56) References Cited

U.S. PATENT DOCUMENTS

| | | |
|---|---|---|
| 6,453,459 B1* | 9/2002 | Brodersen et al. ............ 717/100 |
| 6,615,039 B1* | 9/2003 | Eldering ........................ 455/418 |
| 6,898,800 B2* | 5/2005 | Son et al. ........................ 725/93 |
| 7,020,704 B1* | 3/2006 | Lipscomb et al. ............. 709/226 |
| 7,106,799 B1* | 9/2006 | Sostawa et al. ......... 375/240.24 |
| 7,139,983 B2* | 11/2006 | Kelts ............................. 715/802 |
| 2002/0026645 A1* | 2/2002 | Son et al. ..................... 725/117 |
| 2002/0047899 A1* | 4/2002 | Son et al. ..................... 348/114 |
| 2002/0078456 A1* | 6/2002 | Hudson et al. .................. 725/60 |
| 2002/0088011 A1* | 7/2002 | Lamkin et al. ............... 725/142 |
| 2003/0098869 A1* | 5/2003 | Arnold et al. ................ 345/589 |
| 2004/0030798 A1* | 2/2004 | Andersson et al. .......... 709/232 |
| 2004/0210896 A1* | 10/2004 | Chou et al. ................... 717/174 |
| 2005/0076304 A1* | 4/2005 | Shing ........................... 715/716 |

* cited by examiner

DVD Ingestion Process

DVD Conversion System

*DVD On Demand System*

UI Designer Packager Workflow

High-level Smart Component Architecture

MPEG Background

Graphic Overlay

*Text Overlay*

Hot Spot Highlight

Hot Spot Map

*Hot Spot Map Superimposed On-Screen*

Screen Template

*Visual Layer Composite*

*Exemplary Screen Shots*

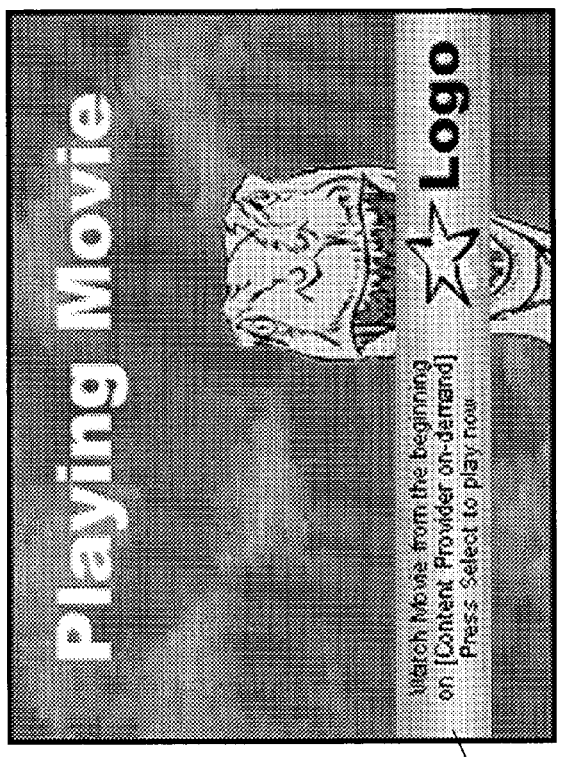
*Exemplary Screen Shots*
FIG. 8A
FIG. 8B

*Exemplary Screen Shots*

Exemplary Screen Shots

UPE Architecture

UPE Internals Architecture

Merchandiser Architecture

Site Manager Architecture

Detailed Smart Component Architecture

SeaChange VOD Adapter / Smart Component

Marquee Product Foundation

Smart Components Extensibility Across Products

Content Center Tools and Architecture

UPE Client Architecture

DVD CONVERSION FOR ON DEMAND

CROSS-REFERENCE TO RELATED APPLICATION

This application claims the benefit of U.S. Provisional Patent Application Nos. 60/395,505 and 60/395,136, filed Jul. 11, 2002 and Jul. 10, 2002, respectively, and which are incorporated herein in their entirety.

BACKGROUND OF THE INVENTION

1. Field of the Invention

The present invention relates generally to providing video on demand (VOD) to a viewer over a network. More specifically, the present invention relates to providing a virtual digital versatile disc (DVD) experience over a network to a viewer whenever the viewer desires.

2. Related Art

With the growing availability of VOD infrastructure, both network operators and content providers have begun to view VOD as an opportunity to bolster their margins and introduce new business models to take advantage of the growing consumer appetite for on-demand content. Content providers such as HBO, Showtime, and Starz have begun creating VOD services wherein network subscribers pay to see movies and original programming when they want it.

Despite the enormous opportunities presented by VOD, it has been difficult for network operators and content providers to create effective on-demand services across the diverse set-top boxes (STBs), VOD servers/systems, and head-ends deployed by the network operators. As a result, the VOD viewer experience often suffers from slow session initiation, time-consuming software downloads, sluggish response times, and limited use of audio, video, and graphics. Conventional VOD services provide movies on demand but with no more features than already available using video cassette recorders (VCRs). Lackluster menu systems fail to engage and entertain subscribers. In an industry that spends many millions of dollars on marketing the average movie, very little on-screen promotional material is used to entice subscribers into trying and buying on-demand content and services. The vast creative resources of content providers are not leveraged to help create compelling experiences designed to sell more content.

With DVDs, on the other hand, the viewer is presented with a highly interactive interface and the ability to access a variety of special features including without limitation the following: interactive menus with video and audio material drawn from the content itself; scene selection capability; interviews with actors and directors; theatrical trailers; television spots; audio clips; music videos from the sound track; standard and wide screen viewing aspect ratios; subtitles and audio tracks in various languages; director and cast biographies; director's comments on certain scenes; production notes; Easter Eggs; out-takes; shots from different angles; and shots that have been edited out. The viewer typically enjoys a much richer entertainment experience when viewing a DVD. Further, the information and entertainment included on a DVD is rapidly expanding.

Exemplary patents relating to VOD include: U.S. Pat. Nos. 6,314,572, 6,314,573, 5,619,249, 5,113,523, and 5,367,636.

Exemplary patents relating to STBs include: U.S. Pat. Nos. 5,235,619, 5,355,480, 5,357,276, 5,440,632, 5,481,542, and 6,212,278.

Exemplary patents relating to menu systems include: U.S. Pat. Nos. 6,331,877, 5,539,479, 6,118,443, 6,208,335, 5,966,162, and 6,133,909.

Exemplary patents relating to interactive TV include: U.S. Pat. Nos. 5,961,603, 5,999,970, 6,049,539, and 6,198,509.

Exemplary patents relating to DVD include: U.S. Pat. Nos. 6,341,375, 5,929,857, 5,915,018, and 6,208,350.

All references cited herein are incorporated by reference to the maximum extent allowable by law. To the extent a reference may not be fully incorporated herein, it is incorporated by reference for background purposes, and indicative of the knowledge of one of ordinary skill in the art.

SUMMARY OF THE INVENTION

Although DVDs generally offer more features and interactive content for the viewer, there are several disadvantages associated with DVDs. DVDs are expensive and either renting or buying a DVD typically means the experience is not available to the potential viewer "on demand," and therefore, the viewer is further inconvenienced by having to leave his or her house or other location to purchase or rent the DVD. The viewer may be additionally frustrated if the desired DVD is sold out or otherwise unavailable at the sale or rental location. A DVD disc, whether rented or purchased, can become scratched and unplayable, further diminishing their appeal. While DVDs may also be mail ordered, the viewer must wait several days for delivery of the DVD. In addition to these other inconveniences, the viewer must also bear the added cost of owning a DVD player.

The only existing method that might provide a DVD on demand experience is a manual conversion of the DVD content to a format compatible for delivery over a network by a VOD server/system. This manual conversion, however, would be time consuming and expensive.

Further, it may be desirable to add, delete or modify certain elements of the DVD content in order to work within the constraints of networks, systems, and processes which may not have been anticipated by the original DVD designers. For example, removing certain video assets and features such as wide screen aspect ratio video and additional language capabilities may be desired in order to reduce storage and bandwidth requirements. Another such example is adding menus and navigation techniques in order to fit into a larger menu framework or on-demand portal with other content. An additional such example is changing highlights from images to rectangles in order to reduce download time and memory requirements in certain network and STB environments. A further such example is to customize the on-screen transport controls to include DVD controls such as scene selection and enhance branding for the network operator or content provider. An added such example is adding additional menus and associated metadata to support the sale of related content and merchandise.

Further, there are few standards today governing how VOD servers/systems provide session management, asset management, stream control, and application interactivity. In order to deliver a DVD experience to a wide range of subscribers, a system that is compatible with a variety of VOD servers/systems and STBs would be desirable.

Additionally, once the content is converted to a format compatible with delivery over a network it will be desirable for interactive designers and others to review the modified DVD content. A system that would enable review of the DVD experience using readily available computer hardware and software without necessitating an investment in a VOD server/system and network infrastructure would be highly desirable.

A need therefore exists for a system and a method that allows a viewer to enjoy the rich DVD entertainment experience when he or she desires which overcome the limitations of the prior art. A system that allows a viewer to experience DVD-like features on demand without having to buy or rent the DVD and DVD player would have great advantages over the prior art. A system that automates and streamlines the conversion process would have great advantages over the prior art. A system that enables the DVD content to become part of a larger menu framework or on-demand portal would have great advantages over the prior art.

The present invention achieves these goals by providing: automated DVD conversion; on-demand merchandising; time and location sensitive distribution; and ubiquitous presentation as summarized below.

Automated DVD conversion includes providing decrypted access to the DVD file structure; demultiplexing and reorganizing all the various data found on the DVD; converting the DVD presentation and navigation data into XML suitable for use in user interface design tools; converting the demultiplexed and reorganized digital assets into forms suitable for the targeted network infrastructures; and organizing and packaging the files into bundles suitable for importing into the systems responsible for delivering the experience across the network infrastructure onto a presentation device. On-Demand Merchandising includes associating new DVD content with an existing menu framework or on-demand portal with other content, pruning undesired portions of the new content, improving navigation within and presentation of the new content, overlaying interesting and related merchandising, and enabling quality assurance. Time And Location Sensitive Distribution includes translation, transcoding and packaging for unique target environments, and timely delivery of the packages via any delivery mechanism. Ubiquitous Presentation includes adapting to various network delivery infrastructures for presentation to a viewer using a variety of VOD servers and STBs.

The present invention vastly increases the number of interactive features available over the prior art VOD systems, which increases the likelihood that the viewer will be enticed to purchase more on-demand content, thereby increasing revenue for network operators and content providers.

The present invention also provides unique advantages relating to the ability of the system to provide DVD on demand to any number of different manufacturer's STB or other customer premise equipment and through any number of different VOD servers/systems. Furthermore, the DVD on demand system of the present invention helps network operators and content providers sell more on-demand content and in the process improve their ROI while increasing profits and cash flow.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIGS. 8A, 8B, 8C and 8D depict exemplary user interface screens in accordance with another embodiment of the present invention.

DETAILED DESCRIPTION OF THE INVENTION

Figure 1:
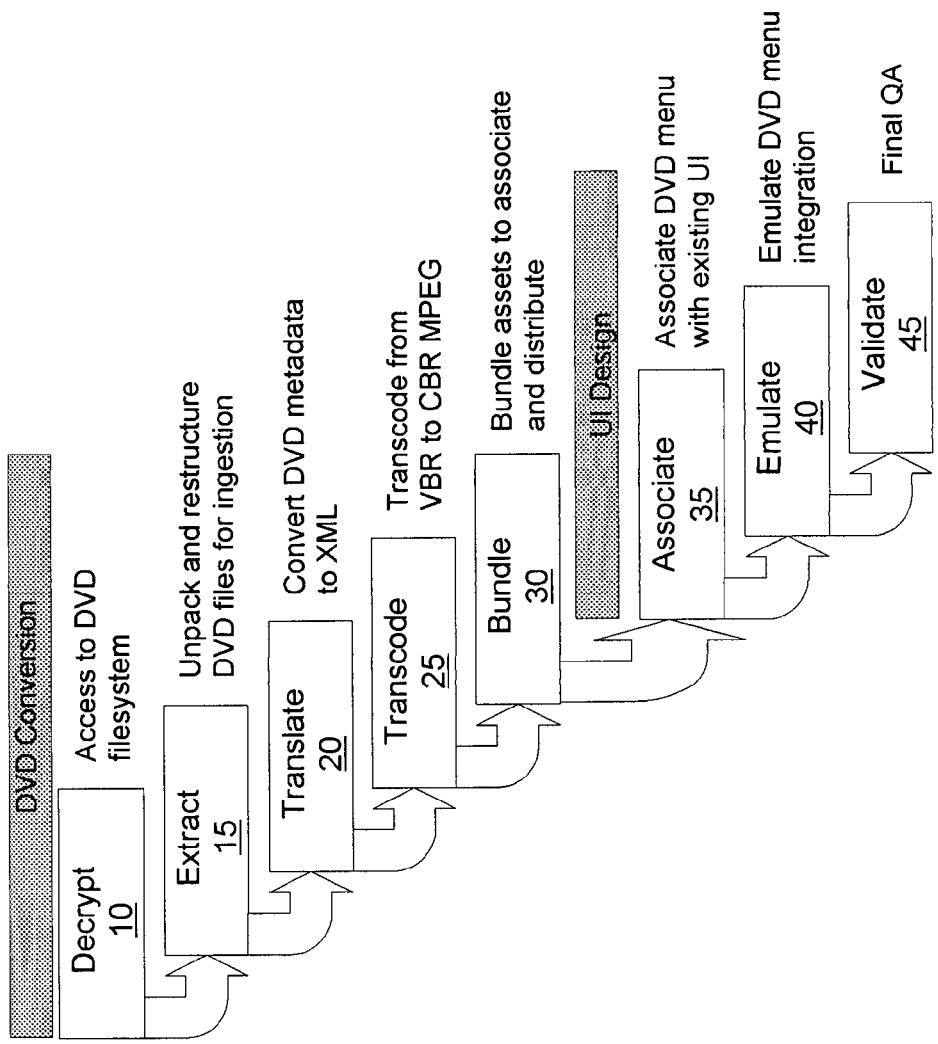
FIG. 1 depicts a process flow diagram for implementing DVD ingestion in accordance with the present invention.

To fully understand the DVD conversion process, it is beneficial to describe both the syntactic and semantic aspects of DVD. Syntactically, DVDs lay out a file structure that includes a VIDEO_TS directory containing all the files related to the viewable content on the disc. The DVD file structure dictates the names of individual files. A file is either an information file (.IFO), a video object file (.VOB), or a backup of the information file (.BUP). A particular piece of video is referred to as a title. A DVD groups related titles into video title sets (VTS) containing information about the titles such as: interactive menus; time maps; and cell addresses. A typical DVD contains a special VTS known as the video manager (VMG) title set which contains the main menu of the disc called title menu or top menu. The VMG is stored in the VIDEO_TS.IFO (VMGI) and VIDEO_TS.VOB files. The remainder of the DVD is comprised of other VTS. The number of VTS varies from 1 to 99. Each VTS contains an information file, VTSI, (e.g., VTS_01_0.IFO), a menu file (e.g., VTS_01_0.VOB), and one or more video files (e.g., VTS_01_1.VOB).

All data on a DVD is stored in title sets. Each title set is comprised of an information file and zero, one, or more video object files. The video object files, ending with .VOB, are known as video object sets (VOBS). A VOB contains an MPEG-2 program stream. A VOB is composed of one or more cells. A cell typically represents a scene or chapter of a movie. A cell is composed of one or more video object units (VOBU). A VOBU is the smallest unit of playback. A VOBU contains zero or more of any of the following: navigation pack (required, one only), video pack, audio pack, or subpicture pack. The video pack is an MPEG-2 group of pictures (GOP) which is a sequence of I-frames and associated P and B frames. Finally, VOBU are broken into packs of packets. The packs and packets comply with the MPEG program stream standard.

Semantically, a DVD's presentation data controls the order in which the physical data is presented. Like the physical data, there is a hierarchical relationship between the presentation data structures. The presentation data and physical data converge at the cell level. The physical data contains the cell, while the presentation data points to the cell. Five different presentation data structures comprise the presentation data. At the highest level, titles represent the overall view of the entire DVD. The VMGI is the highest level title information, hence, it represents a view of the entire DVD. Each title can contain up to 999 program chains (PGC). The first PGC in a title is known as the entry PGC. A PGC contains a program chain information (PGCI) structure. The PGCI contains a presentation control block (PCB) which references 0 to 99 programs (PG). A PG serves as a cell group. A PGC that contains zero PG is known as a dummy PGC and is used for navigational purposes only. For example, the menu VOB is optional in the VMG. The VMGI would simply reference the root menu of a VTS. From there, the viewer would begin to interact with the DVD.

Reference is now made to FIG. 1 depicting a process flow diagram for implementing DVD ingestion in accordance with the present invention. Ingestion is similar to importing, which is the process of reading data from external sources into an application. An ingestion process is typically more complicated than importing—it often includes validation, cataloging, archiving, decomposition, characterization, normalization and other data related manipulation and processing. The term Ingestion is most commonly used in relation to processing XML documents in content management and metadata related applications.

The Decrypt step 10 provides decrypted access to the DVD file structure. This Decrypt step 10 allows the ingestion process to read the various files containing the video, audio, stills, data, metadata and interactive menu information. The Decrypt step 10 is optional and is followed if the originating DVD data is found on an encrypted DVD. Typically, DVDs available to consumers are encrypted. This Decrypt step 10 is optional if the DVD is not encrypted or when working directly with data from a DVD authoring environment.

The Extract step 15 demultiplexes and reorganizes the various data found on a DVD. The data found on a DVD has been multiplexed in a manner suitable to support a variety of DVD features such as chapter indices and multiple camera angles. It is in a standard format purposeful to DVD player playback. VOD systems are incompatible with this format and therefore the data is demultiplexed in order to create atomic elements of specific data types acceptable to target delivery systems. The layout of a particular multiplex is described through the association of an informational IFO file and several VOB files that contain the multiplex data.

For example, the main video on a DVD is contained in an MPEG-2 program stream. Within a VOB, the MPEG-2 program stream is multiplexed with other data including other MPEG-2 program streams such as: camera angles; video branching; interactive menus; and presentation control information. The ingestion process needs a contiguous view of these data files, hence, the need for demultiplexing.

The second part of the Extract step 15 reorganizes the atomic elements into a hierarchical structure of folders and files analogous to the multiplexes on the DVD. The content of each VTS is stored in a folder of the same name as the VTS. For example, the content of the VMG title set is placed in the video_ts folder while the content of the first video title set is placed in the vts_01 folder. The names of these folders are made lowercase to further distinguish them from the original files and yet still provide sourcing resolution as needed.

The potential exists for some DVD source data files to span multiple VTS and particularly multiple VOB such as the main video of the DVD. VTS/VOB spanning is primarily due to the maximum size of a file that is set at just under 1 GB. Depending on the length of a movie the main video will normally span two or more VOB files and potentially two VTS if the movie exists on two layers. During demultiplexing and reorganization all data for VTS/VOB spanning files are deposited within a single file in the folder that first referenced the file.

The Extract step 15 walks the PGC structure and produces individual files for each PGC found in the structure. Preserving the PGC boundaries is desirable in order to reconstruct the advanced features of a DVD like branched storyline and dynamic parental control.

The following Table 1 summarizes the salient reorganization operations and the new files that are produced:

TABLE 1

Reorganization Operations

| DVD Structure | DVD File | Extracted Structure |
|---|---|---|
| VTS | VIDEO_TS.IFO VTS_XX_0.IFO | Directory containing files found in the particular VTS |
| Menu VOB | VIDEO_TS.VOB VTS_XX_0.VOB | Assets related to the menu of the VTS MPEG-2 menu background MPEG-2 menu I-frame Menu layout and button association Navigation logic and associated actions Menu subpictures |
| Title VOB | VTS_XX_Y.VOB | Assets related to titles found on a DVD MPEG-2 title videos, one file for each PGC in the structure MPEG-2 alternate audio MPEG-2 I-frames Menu subpictures Program Chain tables (asset stacks) Program Chain index tables (timecode based) Chapter index table (timecode based) |

The Translate step 20 focuses on converting the DVD presentation and navigation data into XML suitable for use in UI design tools like Concero Marquee UI Designer. The current format of the DVD data structures is a binary data format. Simple, inexpensive DVD players purchased by consumers predicated an efficient, standard binary representation of the data purposeful for the capabilities and limitations of these platforms. In order to efficiently exchange this data between other computing platforms, the data is translated into a more suitable form. The ingestion process translates the data into XML that is becoming the de facto standard for enabling system interoperability. Once the data is expressed in XML, without losing any of its semantic or contextual meaning, it can be easily shared between any XML-enabled systems. Those skilled in the art will recognize the output of this step is not limited to XML and could result in translating the data into other formats suitable for use with other systems.

The XML schema utilized to represent the DVD data structures is compatible with other components found in the Concero Marquee suite of tools. In particular, the UI Designer discussed below in connection with FIG. 3 has the ability to directly import these files and immediately operate upon them without further translation. Several types of XML files are generated. While there is not a one-to-one correlation between the DVD data structures and the translated XML files, all the semantics and context sensitive meaning are preserved.

The following table summarizes the various XML files generated during translation and describes their usage:

TABLE 2

Generated XML Files

| XML File | Cardinality | Description |
|---|---|---|
| Menu Frame | 1 per unique menu | Each navigational menu identified during the Extract step 15 has an associated XML file that describes the relationship between the associated background video, the buttons, and subpicture overlays. |
| Inter-menu Navigation Map | 1 per DVD | Each menu links to other menus or videos themselves. The navigation map represents the relationships between menus and contents. |
| Chapter Index | 1 or more per DVD | The chaptering function within the DVD data structure is based on markers at the beginning to specific program chains. These are converted into timecode indices relative to the beginning to the associated video file. |
| Program Index | 1 per VTS | The PGCs on a DVD link together the multiplexed pieces of a particular video presenting the user a seamless video stream. The Program Index preserves the branch points between various video streams allowing the same experience to be recreated in the on-demand environment. |
| Asset Stack | 1 per PGC path | The potential paths thru a PGC structure are preserved via an asset stack. An asset stack defines a particular path thru the PGC structure ordering the individual video clips properly. For example, there may be one asset stack for the PG version of the movie and another for the R version of the movie. Asset stacks do not replicate the content, but merely reference it; they are analogous to a play list associated with an MP3 player on a PC. |

The Transcode step 25 focuses on converting the digital assets demultiplexed and reorganized in the Extract step 15 into forms suitable for the targeted delivery infrastructures, namely digital cable and the Internet. The term transcode as used in this document applies to any process that takes a digital asset, such as a video, and re-encodes it into another format.

The digital assets found on a DVD are not directly consumable by the systems that deliver an on-demand experience over digital cable or other network infrastructure. DVD video utilizes the variable bit rate (VBR) capability of MPEG-2, while digital cable MPEG-2 is encoded at a constant bit rate (CBR). Even details regarding the size and frequency of GOP within an MPEG-2 stream should be taken into account. Delivering the same video via the Internet is typically accomplished using MPEG-4. MPEG-4 shares many capabilities of MPEG-2 but utilizes different encoding techniques-thus the need for transcoding.

Another facet of transcoding includes conversion from the video standard found on the DVD into the video standard of the target environment. The video standards supported by DVD include NTSC and PAL while the target environments include these as well as others such as SECAM and the various profiles of HDTV.

DVD stills are MPEG-2 I-frames which are fully realized frame of video independent of other frames. The notion of a DVD still is minimally transcoded into a single frame MPEG-2 or MPEG-4 movie. Depending on the target environment this may expand into several GOP. The user perceives the short MPEG movie as a single frame of video.

DVD subpictures are simple run-length encoded pixel maps that can be rendered in four predefined colors. The pixel maps and color specifications are transcoded into the standard BMP format.

The following Table 3 summarizes the before and after formats of the transcoded assets:

TABLE 3

Transcoded Asset Summary

| Asset | Original Format | New Format |
| --- | --- | --- |
| Video Files | DVD MPEG-2 | Bitmaps (e.g. JPEG) of key frames to be used in UI Designer CableLabs compatible MPEG-2 MPEG-4 |
| Stills | MPEG-2 I-Frame | Bitmaps (e.g. JPEG) to be used in UI Designer CableLabs compatible MPEG-2 I-Frame MPEG-4 I-Frame |
| Subpicture | Pixel map, 2 bit, RLE | Bitmap (e.g. BMP) to be used in UI Designer |

The Bundle step 30 organizes and packages all the new files generated during the Translate step 20 and the Transcode step 25. The Bundle step 30 produces bundles that are suitable for importing into the systems responsible for providing the functionality detailed in the association, pruning, and grooming processes described below. The primary types of bundles are interactive menus and video assets, but are not limited to this scope.

After translation and transcoding in steps 20 and 25, the assets associated with the interactive menus found on a DVD are collected into a structure known as a project. A project can be as simple as a single menu or as complicated as an entire on-demand portal. In support of portals, projects can contain other projects. DVD interactive menu projects represent the typical level of project complexity.

The following Table 4 lists the manifest of a project:

TABLE 4

Project Manifest

| Item | Description |
| --- | --- |
| Menu Frames | All the menu frames (files ending in .frame) associated with the DVD. |
| Images | All the bitmap images that overlay the background video (files ending in .bmp) |
| Backgrounds | All the bitmap images that represent snapshot stills of background videos or still images (files ending in .jpg). |
| XML | All the descriptive data related to chapters and program chains (files ending in .xml) |

Video assets themselves are typically multi-gigabyte files that require special packing and distribution. The Bundling step 30 collects all video assets associated with a DVD into a common folder tree preparatory for distribution. This folder contains a manifest of the files that details attributes such as file size, checksum, run length, etc. The actual process of packaging individual assets for delivery is dependent upon the delivery mechanism and is discussed in more detail below.

When deploying a converted DVD title, it is often associated with an existing menu framework or on-demand portal with other content. The Association step 35 includes three sub-parts: Import, Prune, and Groom. Once the association step 35 is complete, the quality assurance steps of emulation 40 and validation 45 can begin.

The final step of the DVD conversion subprocess creates a UI designer project. The project may be standalone, or more commonly, placed in the context of an existing menu framework or on-demand portal. Once the proper branch is determined one would use the Import function of a UI design tool such as Concero Marquee UI Designer to associate the new DVD project with the existing menu infrastructure of the on-demand portal.

The particular branch of the on-demand portal offering this new DVD title utilizes an instance of the DVD Juke Box Smart Component. This component provides standard access to a collection of imported DVD projects, and is detailed below. Once the new DVD project is imported, the properties of the related DVD Juke Box can be updated to reference the new DVD title.

Once a DVD Juke Box references the new DVD, it is ready for deployment, and could be distributed to target environments. Deployment may not necessarily occur at this point because there may be other steps that are desirable, including pruning and grooming.

Most DVD titles today contain many hours of bonus content with some spanning multiple discs. It may not be economical to include all of the bonus content found on a DVD as an on-demand offering. The process of identifying and removing content from an ingested DVD menu is known as pruning.

Pruning is a highly customizable process that can vary based upon the DVD and the specific needs of the network operators and content providers delivering the virtual DVD experience. The following sections describe example pruning scenarios using the Shrek DVD as an example. The Shrek DVD spans two single sided, dual layer discs. It has over 11 hours of content including fullscreen and widescreen versions of the movie along with all of the bonus material.

The following Table 5 lists all the content found on the Shrek DVD title:

TABLE 5

Example DVD Content

| Disc 1 | Disc 2 |
| --- | --- |
| Fullscreen Movie | Widescreen Movie |
| Chapter Index | Chapter Index |
| Multiple Languages | Multiple Languages |
| Shrek ReVoice Studio | Filmmakers' Commentary |
| Uproarious Interviews | Storyboard Pitch of Delete Scenes |
| Hidden Fun Facts | Technical Goofs |
| DWK: DreamWorks Kids This Way to Play | The Tech of Shrek |
| Game Swamp | Hints for Shrek Xbox Video Game |
| Shrek's Music Room | Character Design Progression Reel |
| Favorite Scenes Selection | Shrek in the Swamp Karaoke Dance Party |
| A Fascinating Behind-the-Scenes Featurette | International Dubbing Featurette |
| Shrek in the Swamp Karaoke Dance Party | |
| Plus: Sneak Peak Trailer, Production Notes, Cast and Crew Bios | |

As can be seen, there are many choices that can be made during the pruning process. Based on business factors such as contractual obligations, target market, and intended audience, as well as technical factors such as available storage and bandwidth, expected peak utilization and buy-rates, the content providers and network operators may choose to only include the fullscreen version of the movie and access to the chapter index. Although this example is described in connection with a movie, it will be appreciated by those of skill in the art that the present invention is applicable to content other than movies, including without limitation, sports programs, music programs, educational programs, games, television shows, and other types of content.

Once a DVD has been sufficiently pruned and the actual on-demand content is well-defined the grooming process can begin. The grooming steps include without limitation the following: navigation optimization; branding; related merchandising; intro offer; pause offer; and exit offer associations.

The DVD conversion process enables all the interactive menus found on a DVD. It is often desirable to enhance and/or otherwise alter the navigation to ensure the on-demand version of the DVD interactive menus work properly in, and interact well with, the menu frameworks and on-demand portals provided by the network operator and content providers. These enhancements can include without limitation the following: tie-in to an on-demand portal; remote control button mapping; button highlighting; intra-menu navigation, inter-menu navigation; and DVD disc merge.

Given the standalone nature of a DVD title, it is desirable to associate it with a particular branch of an on-demand portal or other menu framework. More importantly it is desirable to provide a means of returning from the DVD menus back into the on-demand portal.

The STB remote controls and DVD player remote controls do not typically provide identical buttons, nomenclature, or functionality. It is desirable to ensure that the DVD menu set operates appropriately in each of the target environments. This activity may include mapping DVD player remote control keys such as the TITLE key to an appropriate target remote control key and/or the addition of direct navigation.

DVD titles utilize subpictures in the form of bitmap files to highlight navigable buttons. While on-demand delivery of the DVD menu set supports displaying the same bitmaps it is more bandwidth efficient and therefore more economical to draw rectangular highlights around buttons, provide a navigation cursor that underlines selectable and actionable elements, or change the color of text selections as the navigation cursor moves between elements, to name a few. Most DVD titles offer only simple button highlighting, typically drawing a rectangle around the button, or a simple bitmap next to the button such as an arrow. In these cases, not using the subpicture may be a wise choice. In other cases, as in the Shrek DVD title, many of the button highlights are special purpose and simple rectangles may not be appropriate for cases such as these Depending upon the amount of pruning, it may be desirable to alter the intra-menu (between buttons on a single menu) navigation to disallow access to pruned portions of the DVD menu set. Also, it may be desirable to augment intra-menu navigation connecting any branding or merchandising interactive content.

While the flow of inter-menu (between different menus) navigation found on a particular DVD title can be entirely ingested into UI design tools such the UI Designer discussed in more detail below, the ingested DVD menu set typically requires alteration. Generally, the inter-menu navigation is simplified during the pruning process. Buttons that link to pruned submenus can be deactivated. The screen real estate associated with the deactivated buttons can be overlaid with branding or merchandising.

More and more DVD titles utilize multiple discs to provide large quantities of bonus material and other content. The more successful the movie has been at the box office, the more likely it will have multiple discs. While it is possible to treat these discs as separate DVD menu sets the on-demand user experience may be better served by a merged set of functionality. Also, taking into account the pruning process, it is likely that assets from both discs will be utilized.

The network operator or content provider offering a particular DVD on-demand may want to ensure their brand is prominently displayed on the DVD interactive menus. This is typically accomplished by placing a logo icon in a consistent location throughout the entire on-demand portal, menu, or menu branch.

The DVD control transport is an on screen representation of the transport control, providing access to normal DVD functionality like fast forward, rewind, chapter search, etc. Given the number of times users are likely to pause a movie, the DVD control transport becomes an effective marketing tool providing space for branding and merchandising related content. A decision can then be made to utilize the standard DVD control transport, which is configured by default, or create a new pause offer directly related to the content on the DVD.

Another prime opportunity to promote content and merchandise to the viewer occurs when the movie is stopped whether at the end of the movie or when the user presses the stop button on the remote. Business analysts can decide whether to utilize a standard exit offer which relates other content and merchandise based on movie genre and viewing habits or create a specific exit offer directly tied to the content itself. Once the standard offers are finalized, it is possible to add other merchandising information to various menus and submenus of the DVD. This could be an extension of branding, offers of related merchandise, etc. Any secondary merchandising will be driven by the business goals of the network operator and content provider.

Once a DVD menu set has been sufficiently pruned and groomed, its actual operation on a particular STB should preferably be, but is not required to be, emulated using UI design tools such as the UI Designer Emulator in step 40. All the relevant navigational paths can be exercised to ensure integrity. The emulator has the ability to emulate the target STB environments; therefore, the process should be repeated for every target environment. For example, if the DVD menu set is targeted at both a Motorola DCT2000 and a Scientific-Atlanta Explorer 2000, the navigational tests should be conducted in both modes. Performing a thorough navigational test in all emulated target environments ensures the DVD menu set will function properly once deployed.

The final step in readying a DVD menu set for deployment is validation of the associated video assets in step 45. Any video assets, including any full motion video, audio, and stills, associated with the DVD menu set should preferably be, but are not required to be viewed and inspected for quality. The Transcode step 25 should not degrade the video quality below the quality minimums of the target environment. For example, the standard constant bit rate utilized for delivering video on-demand via a digital cable television infrastructure is 3.75 Mbps. DVD utilizes a variable bit rate up to 10 Mbps. Most DVD titles average more than 4.8 Mbps. The Transcode step 25 may re-encode the assets down to 3.75 Mbps, thereby causing a loss of quality over the original DVD video. The quality degradation is a well-known and acceptable trade off made by the digital cable television industry enabling transmission of several concurrent on-demand video streams in place of a single analog channel.

Metadata, as it relates to on-demand content, represents description data related to the content itself. For example, a movie's metadata typically contains information including without limitation the title, short descriptions, medium descriptions, long descriptions, year made, actors, director, producer, etc. Few standards exist to express this metadata, and where standards do exist, they are only applicable to their intended target environment.

Once DVD metadata is extracted or created, it is optionally maintained in an Asset Distribution Interface (ADI) format or is maintained in a data store such as Concero Marquee Content Manager. If the DVD metadata is maintained in the Concero Marquee Content Manager it will be automatically converted into an ADI structure based on its distribution schedule and provided to a content distribution system such as a satellite-based Pitcher system which sends the content and DVD metadata to their targeted destination sites. A Catcher system will receive the ADI structure and associated content files and deliver them to the system responsible for presentation of the UI such as the Concero Marquee Universal Presentation Engine (UPE). The Concero Marquee UPE then validates the ADI structure and associated content files, and after an optional quality assurance (QA) process, makes the metadata and content files available for presentation.

Figure 2:
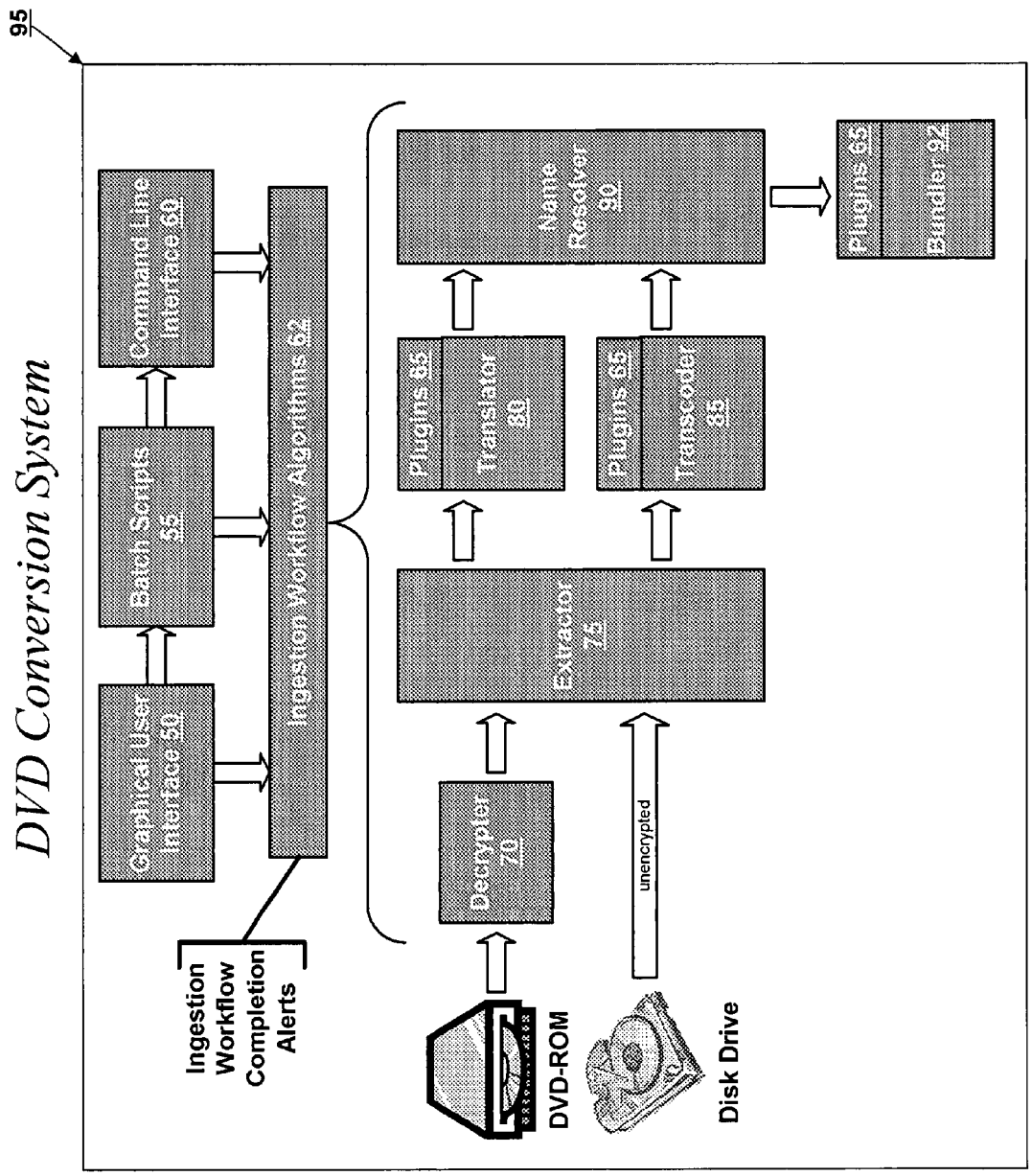
FIG. 2 depicts a block diagram of the automated DVD Conversion System in accordance with the present invention.

Reference is now made to FIG. 2 depicting the automated DVD Conversion System 95 providing a drag-and-drop graphical user interface (GUI) 50 that leverages preconfigured batch processing scripts 55 built upon a foundation of command line interfaces (CLI) 60. Some parts of the system 95 adjust to the requirements of the target environment via pluggable modules referred to as Plugins 65. Plugins 65 allow the conversion system 95 to address future translating and transcoding requirements.

The GUI 50 provides an intuitive, drag-and-drop interface that provides access to all the functions of the DVD conversion system 95. A user of the GUI 50 can configure and schedule batch processes, automating the majority of the work involved in the conversion process.

Batch scripts 55, written in standard scripting languages such as Perl, provide the ability to process many CLI calls by executing one command. The GUI 50 leverages scripts to provide the majority of its automation. The DVD conversion system 95 supports any programmatic scripting language that can access and control CLI utilities.

The CLI 60 provides a set of tools that perform the basic steps of the automated conversion process. The CLI 60 can operate in batch mode as well as interactive mode. The dual interface mode provides greater flexibility for the user.

The Ingestion Workflow Algorithms 62 provide a standard library of well defined objects, interfaces and methods that provide access to the majority of the functionality found in the system.

The Decrypter module 70 implements the Content Scrambling System (CSS) utilized to encrypt DVD content. The Decrypter 70 provides full pass-through decryption as well as programmatic decrypted access. The flexible module 70 allows a DVD title to be fully decrypted and separately stored, or decrypted access can be provided on an as needed basis for such purposes as DVD file system traversal, inspection, and selection.

The Extractor module 75 implements the Extract step 15 of the ingestion process described in connection with FIG. 1. The Extractor 75 removes and reorganizes the assets found on a DVD into a form suitable for the remainder of the process. After or during the extraction, which performs in store-and-forward or stream modes, the DVD assets can be translated and transcoded in parallel, thus conserving resources and increasing efficiency between processor-bound and input/output-bound algorithms.

The Translator module 80 implements the Translate step 20 of the ingestion process described in connection with FIG. 1. The Translator 80 converts all the presentation and navigation data found on a DVD title into XML documents that can be utilized by UI design tools such as the Concero Marquee UI Designer and its related Smart Components.

The Transcoder module 85 implements the Transcode step 25 of the ingestion process described in connection with FIG. 1. The Transcoder 85 converts all the digital assets such as video, audio, and subpictures into formats used by systems that present the DVD experience across the network onto a presentation device such as the Concero Marquee UPE.

The Name Resolver module 90 maps digital assets such as video, audio, and subpictures ingested during the transcode step to their references in the interactive menus ingested during the translate step.

The Bundler module 92 implements the Bundle step 30 of the ingestion process described in connection with FIG. 1. The Bundler 92 groups related assets into a project to be used by UI design tools such as the Concero Marquee UI Designer.

Figure 3:
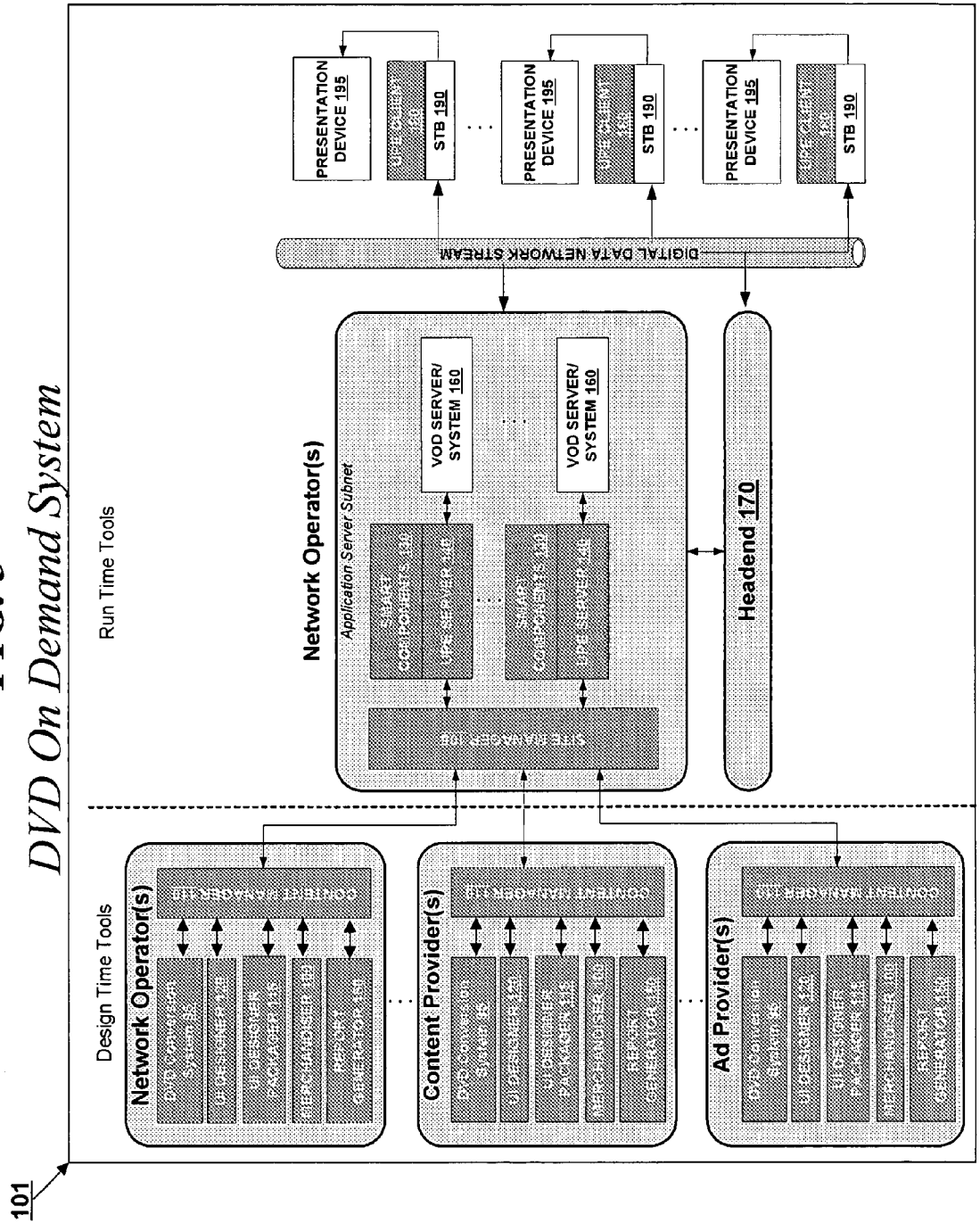
FIG. 3 depicts a block diagram of a VOD system incorporating DVD On Demand in accordance with the present invention.

Reference is now made to FIG. 3 depicting a block diagram of a VOD system adapted for use with a DVD on demand system in accordance with the present invention. The system 101 comprises: a DVD On-Demand Conversion System 95 comprising a software system running on a computer; a Content Manager 110 comprising a storage device controlled by a software system; a Site Manager 105 comprising a software system running on a computer; Report Generator 150 comprising a software system running on a computer; a UI Designer 120 comprising a software system running on a computer; a Merchandiser 100 comprising a software system running on a computer, and a UPE comprising a software system controlling a server system which presents the DVD experience to the viewer. UPE Server 140 receives the asset bundle from the UI Designer 120, or Content Manager 110 when available, by a file transfer mechanism. Alternatively, the bundled asset may be delivered on a tape or other durable storage medium. UPE Client 180 receives the content to be presented to the viewer on the Presentation Device 195 in the digital stream received by the STB 190. The STB 190 can be any device capable of decoding MPEG such as a residential gateway, game console, or personal computer. The STB 190 is connected to the head-end 170 of a network provider by a network infrastructure such as HFC, ATM, or other similar broadband network. The VOD Server/System 160 provides the on demand content storage and streaming at a network operator location. Smart Components 130 are software modules that extend the capability of other system components including but not limited to the UI Designer 120 and the UPE.

The DVD On Demand Conversion System 95 may be located at the content provider location, network operator location, location and other such locations where these services are provided. The STB 190, UPE Client 180 and Presentation Device 195 may be located at the subscriber location. The UPE Server 140, VOD Server/System 160 and Head-end 170 may be located at the network operator location. The UI Designer 120, Merchandiser 100, Smart Components 130, Report Generator 150, and the Content Manager 110 may be located at the content provider location and at the network operator location.

UI Designer

Figure 17:
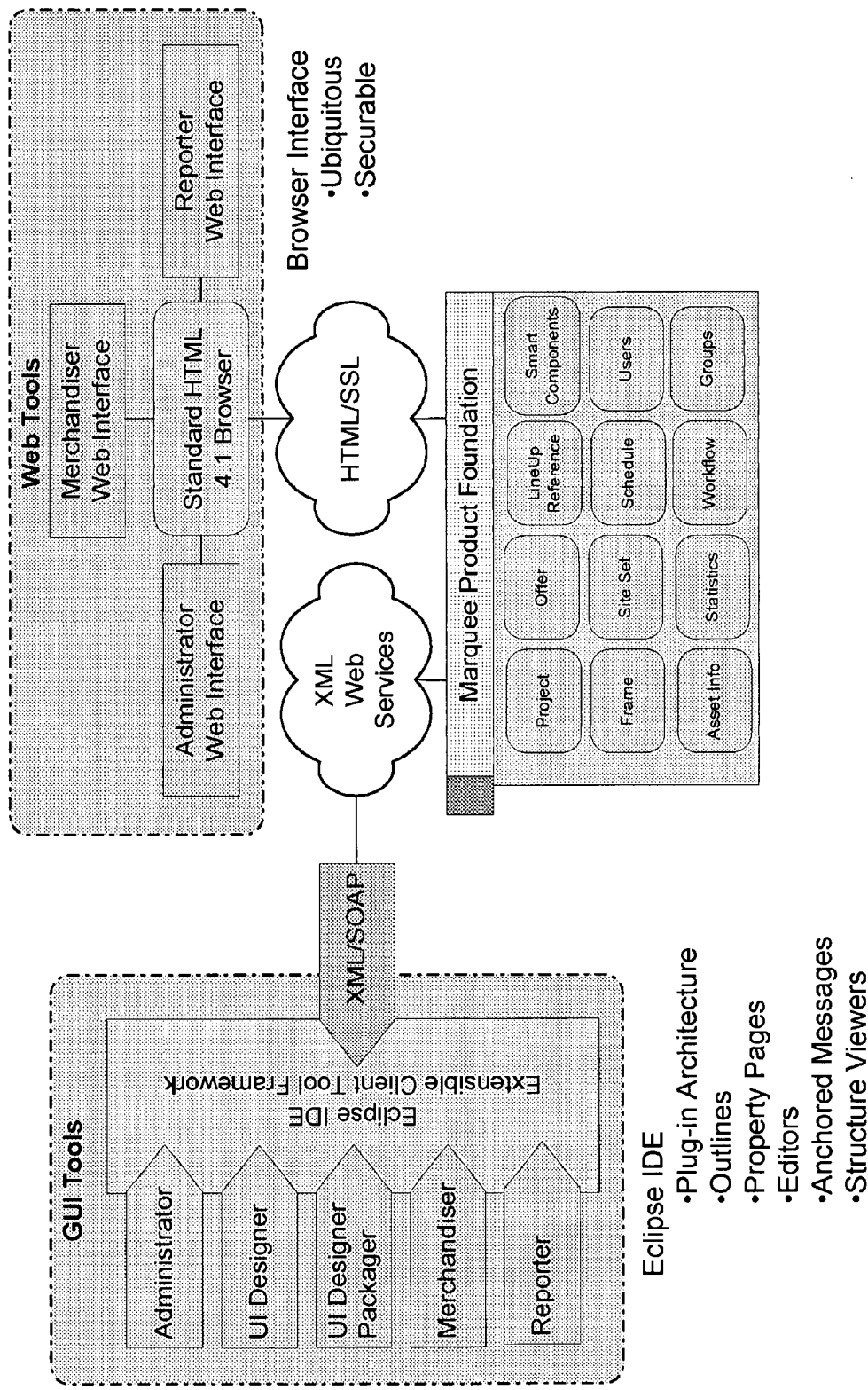
FIG. 17 depicts a block diagram of the Content Center Tools and Architecture in accordance with the present invention.

Reference is made to a block diagram of the Content Center Tools and Architecture as shown in FIG. 17. The UI Designer 120 is a desktop application that allows designers to modify the interactive experience and prepare it for presentation on STB 190. The UI Designer 120 ingests the DVD XML files and provides presentation tools that allow emulation of the ingested content on a computer without the aid of STB 190. Those skilled in the art will recognize the UI Designer 120 could also be used to develop and modify experiences based on presentation elements developed in other formats and tools such as Adobe Photoshop and Adobe Premier or more DVD-centric authoring tools like DVDit and DVD Studio Pro.

The user interfaces created with UI Designer 120 can be comprised of full motion MPEG video backgrounds, MPEG still images, graphics, text, and audio. The video and audio can come from a broadcast, multicast, or session created by a VOD server. The benefit of leveraging full motion video and audio in an interactive TV experience is that TV viewers are accustomed to listening to and watching rich multimedia experiences on TV instead of reading and analyzing motionless and soundless web pages on TV. The UI Designer 120 enables interactive artists to move away from the limitations of web-on-TV to an entertaining video and audio TV-on-TV experience.

Using the UI Designer 120, designers no longer need to write source code in C or Java to create interactive features and system functions for the user interface. Rather, designers can use drag-and-drop functionality and property configuration sheets to associate the interactive features and functions of Smart Components 130, discussed in more detail below, with the presentation elements of the user interface. Smart Components 130 can include presentation controls, system functions, and user features typically associated with interactive applications and user interfaces.

During design time, UI Designer 120 can access the available Smart Components 130 either from a file system or Content Manager 110. The available Smart Components 130 appear in UI Designer 120 as icons in a design palette. The designer can select the icons representing the appropriate Smart Components 130 and visually drag them onto the active frame. Smart Components 130 enable the designer to add elements to frames such as: video; audio; images; text; data lists; shapes such as lines, rectangles, circles; and functional script.

Once the Smart Component 130 is instantiated on the frame, the designer can use the Smart Components 130 property sheet to configure specific properties. Each Smart Component 130 has its own unique properties that can be configured based on the functionality it was designed to provide. Such properties include variables such as: x and y coordinates; width; height; and data source. The Smart Components 130 can reference data sources, which can include a data set in the file system, a data set maintained in Content Manager 110, or an externally maintained data set such as a list of assets on a VOD Server/System 160.

Once the frame is complete, the designer can save the frame into a project folder. A project is comprised of one or more frames that will be transcoded and packaged together for delivery to the UPE Server 140. A project can be maintained in a file system or in Content Manager 110.

Figure 4:
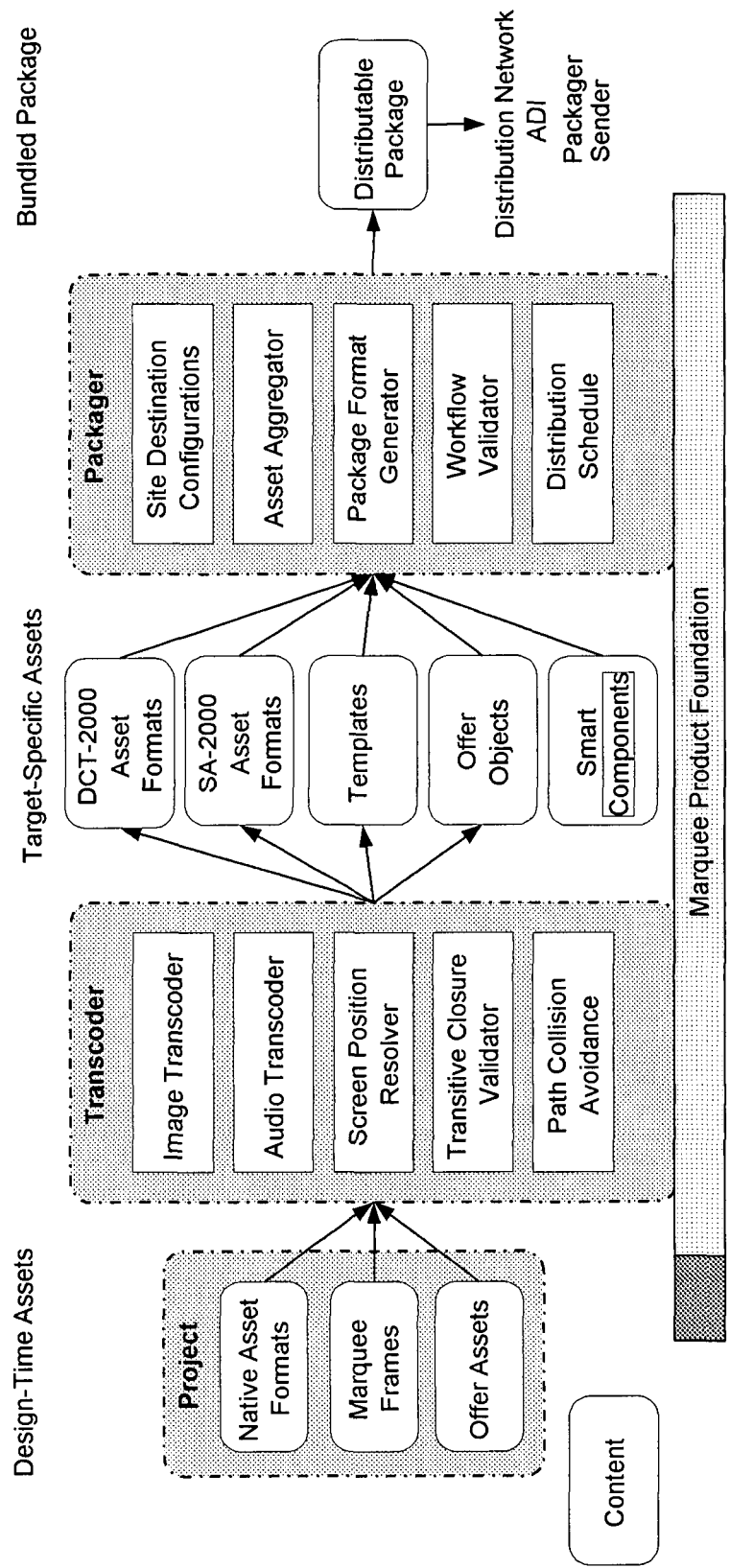
FIG. 4 depicts a block diagram of the UI Designer Packager workflow in accordance with the present invention.

FIG. 4 depicts a block diagram for the UI Designer Packager workflow in accordance with the present invention. When the project is ready to be delivered to a particular set of UPE Servers 140, the UI Designer Packager 115 converts the frames and assets in a project from the format used by UI Designer 120 during design time to a format used by the UPE Server 140 during run time. The UI Designer Packager 115 makes many changes to the different design-time assets. This is known as the transcode process. Images, audio files, and other assets are converted from personal computer format to a format ready for display on the specified set-top box type. Each frame's asset positions are intelligently adjusted to appear correctly on the specified set-top box type. All links and asset references are validated as successfully referenced. After the project assets are transcoded, the transcoded assets, offers and required Smart Components are provided to the UI Designer Packager 115.

The UI Designer Packager 115 configures any specific UPE Server 140 site destination settings and packages together the provided assets. Any references to externally located assets such as a video background are added to an external asset references context file that is generated and maintained within the package boundary. When the package and its external asset references context file are complete it is stored in a file system or in Content Manager 110. The package is then ready for distribution to one or more UPE Server 140 sites.

Content Manager

Managing the content associated with the interactive experience can be done manually using a file system and data files. Alternatively, Content Manager 110 shown in FIG. 3 can be used to streamline the data management effort associated with maintaining large amounts of content. The Content Manager 110 is a software system with a web-based user interface along with a web-services interface accessible through Concero Marquee UI Designer that enables the content registering, versioning, data validation, and packaging of digital assets and related metadata associated with the user interface and interactive services. The Content Manager 110 can exist at the content provider location, the network operator location, or both locations.

The Content Manager 110 manages the relationships between different content registered in the system. The Content Manager 110 provides a flexible platform for managing content metadata to optimize the merchandising process and ensure the right content, gets to the right site, at the right time. The Content Manager 110 enables collaborative, secure, and auditable access and operation on content, frames, and projects to maintain and manage system integrity.

The Content Manager 110 provides an interface to configure distribution schedules and accepts schedules provided by other systems in standards-based formats such as iCalendar, RFC 2445, and ISO-8601-2000(E). Content Manager 110 verifies the required assets are available for distribution and are in the appropriate format for delivery to a particular UPE Server 140. Content Manager 110 can package content into a format suitable for different delivery methods such as: digital tape; disk; FTP; email; and satellite pitcher/catcher systems.

Merchandiser

Figure 11:
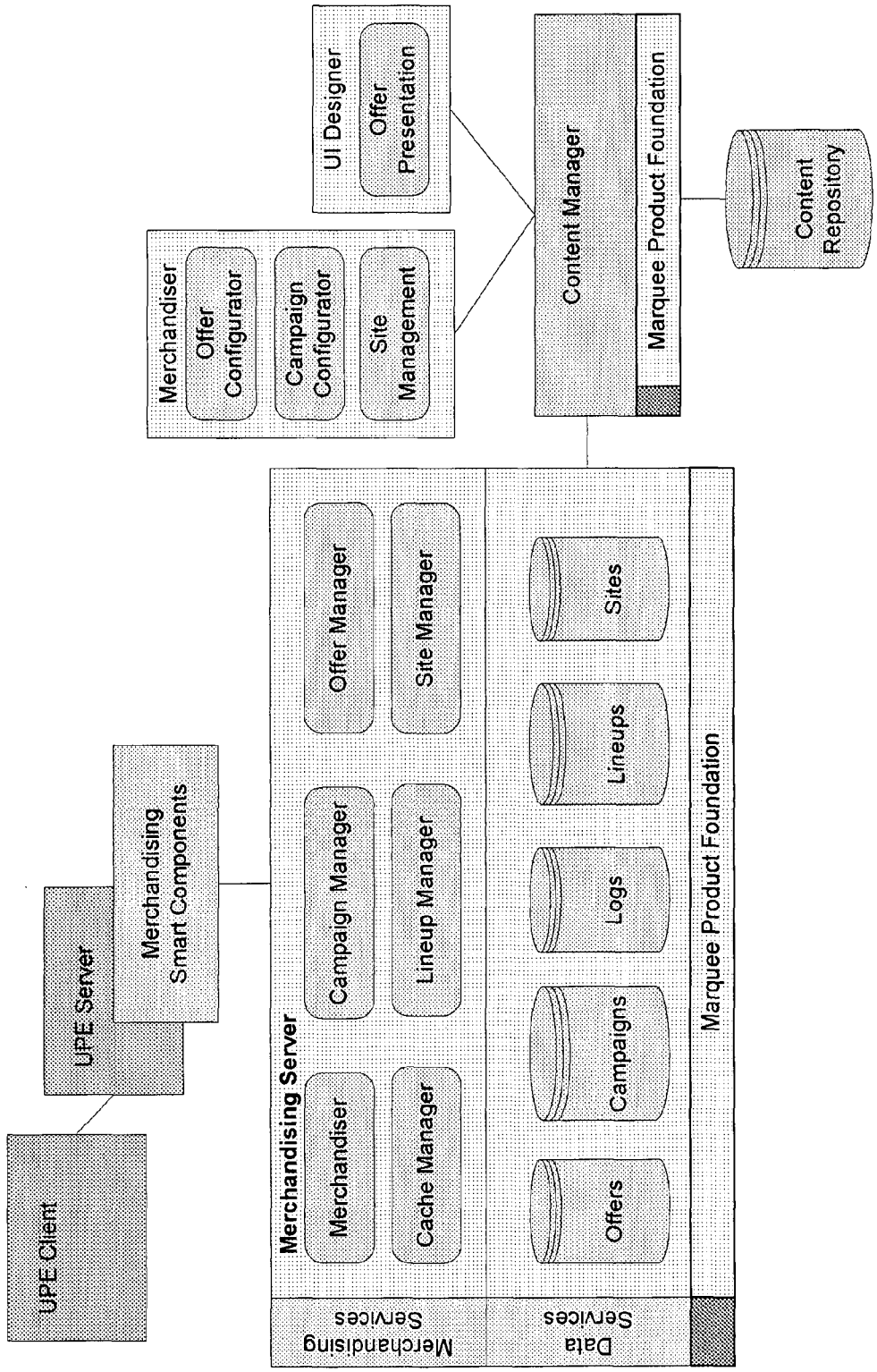
FIG. 11 depicts a more detailed block diagram of the Merchandiser architecture in accordance with the present invention.
Figure 12:
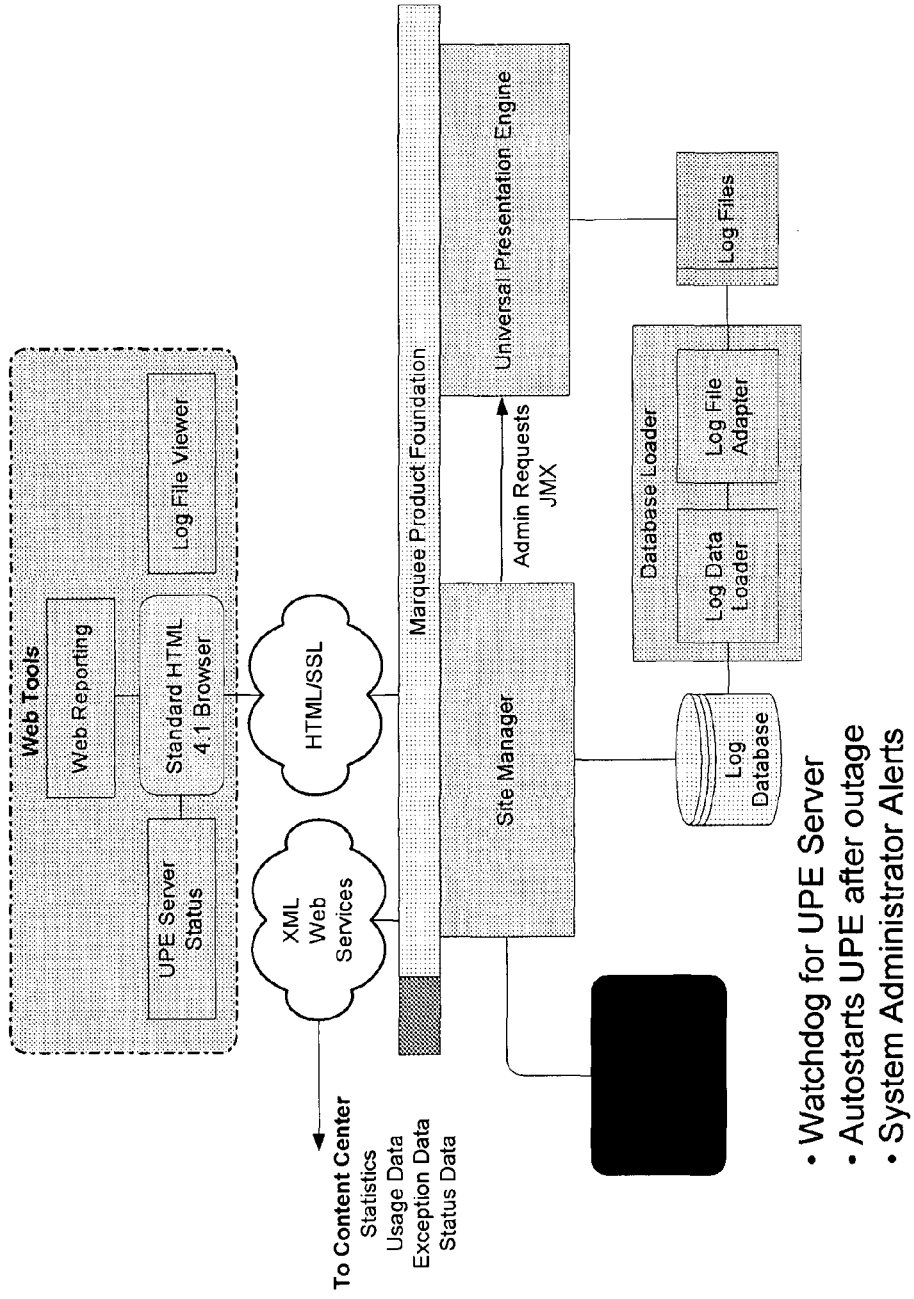
FIG. 12 depicts a block diagram of the Site Manager architecture in accordance with the present invention.

The Merchandiser 100 of FIG. 3 is a software system with a web-based user interface that enables creation and management of promotional offers to sell content and merchandise. A block diagram of the Merchandiser architecture is shown in FIG. 11. Using the Merchandiser 100, marketing and business analysts can use visual design tools to configure Smart Components 130 in order to select the presentation elements of a promotional offer. The Merchandiser 100 changes the process of creating dynamic merchandising offers from a complex and time-intensive software programming effort to an efficient configuration process.

The Merchandiser 100 provides an interface to create and maintain service lines. A service line represents a unique service provided by network operators to subscribers. Each, service line can have one or more line-ups. A line-up is composed of offers which represent the list of content and merchandise available for sale and the terms and conditions under which it can be sold. Offers can be provided to subscribers based on variables such as: conditional business rules; content state; offer state; subscriber state; subscriber profile; or usage statistics. The Merchandiser 100 supports creation of the promotional offers typically associated with on-demand content such as: Up-sell; Cross-sell; Bundle; Discount; Coupons; Intro; Exit; etc.

The Merchandiser 100 provides an interface to create and maintain ad pools. Ad pools contain ad assets such as banners and click-through ads. An ad pool is a data set that a Smart Component 130 can reference as a data source to be populated on a frame. Merchandiser 100 can maintain ad pools or integrate with third-party ad server systems to maintain and provide ad pools.

The Merchandiser 100 provides the ability to create and maintain logical groupings of UPE Servers 140 that can be managed as a single entity known as a site set. Site sets allow business analysts to segment markets so that projects and individual assets can be distributed to specific site sets in order to identify and optimize the variables that drive subscriber buy and view rates. Merchandiser 100 can create marketing campaigns that enable target marketing and demographic, geographic and temporal analytics.

Report Generator

The Report Generator 150 of FIG. 3 is a software system with a web-based user interface that provides standard reports for business, marketing, and administrative users. Reports are available for data and statistics including: impressions and click streams of frames; presentation controls; specific content presented; merchandise view and buy rates; system configuration; user access; project completeness; and advertising reports. Access to viewer habits and choices are the validating feedback for business and marketing owners to adjust and experiment with new user experiences and offers. Capacity and utilization statistics and trend analysis reports forewarn system administrators of potential system resource exhaustion.

Site Manager

Site Manager 105 provides UPE Server 140 management. Site Manager 105 is used to unpack packages and deploy the package assets into the UPE Server 140 site. Site Manager 105 is used to monitor the status of the UPE Server 140 and notify system administrators of warnings or errors. Site Manager 105 is used to start and stop the UPE Server 140.

When a package is received, the Site Manager 105 unpacks it, verifies that all the assets that are listed to be in the package were received, and then adds the assets from the package into the UPE Server 140 site. The Site Manager then validates that the externally referenced assets supporting the package exist and can be located at the UPE Server 140 site.

The Site Manager 105 provides the option to stage the deployed package for quality assurance testing. After any staging, the Site Manager 105 allows the new package assets to be scheduled for viewer availability.

UPE

Figure 9:
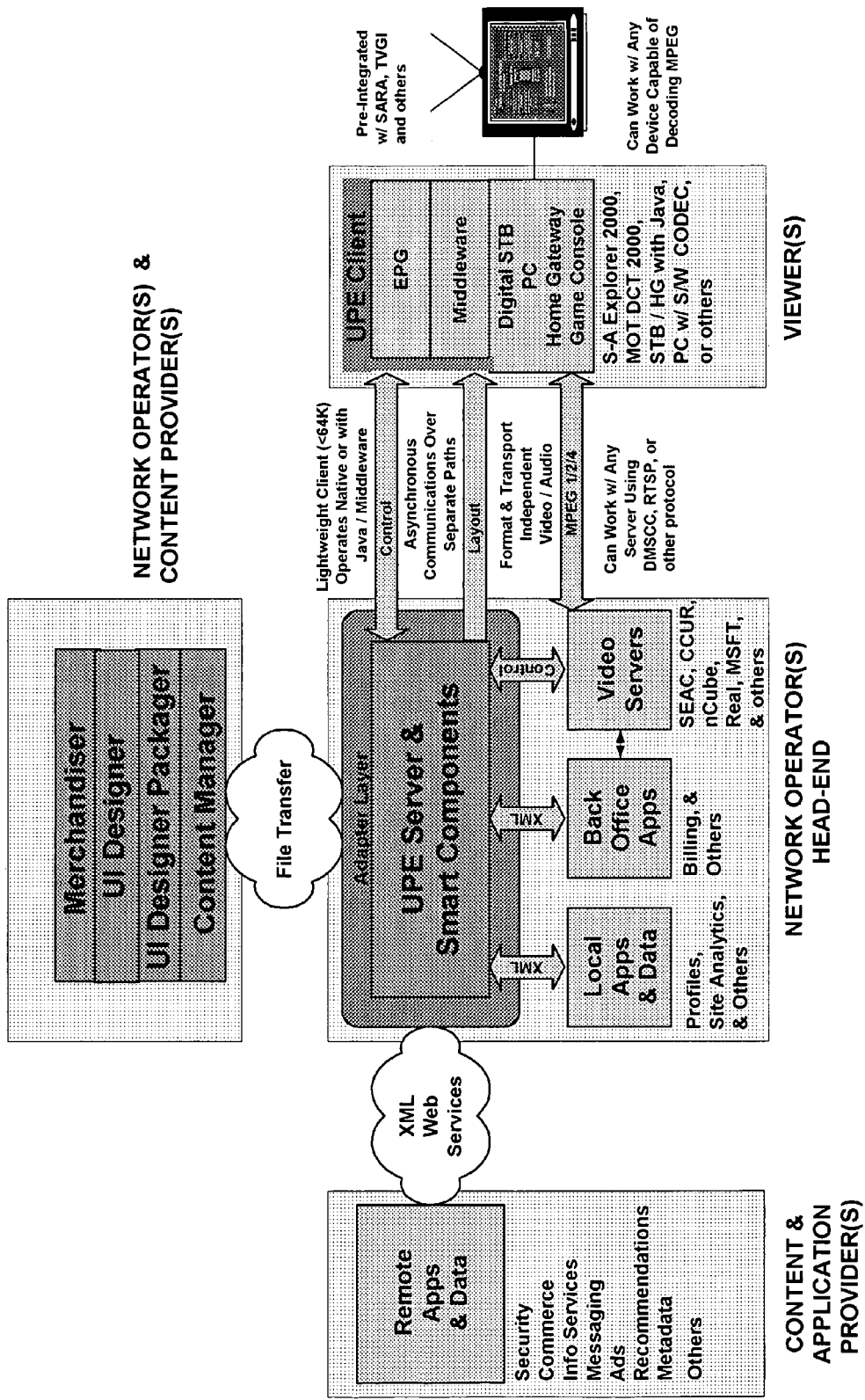
FIG. 9 depicts a block diagram of the Universal Presentation Engine (UPE) architecture in accordance with the present invention.
Figure 10:
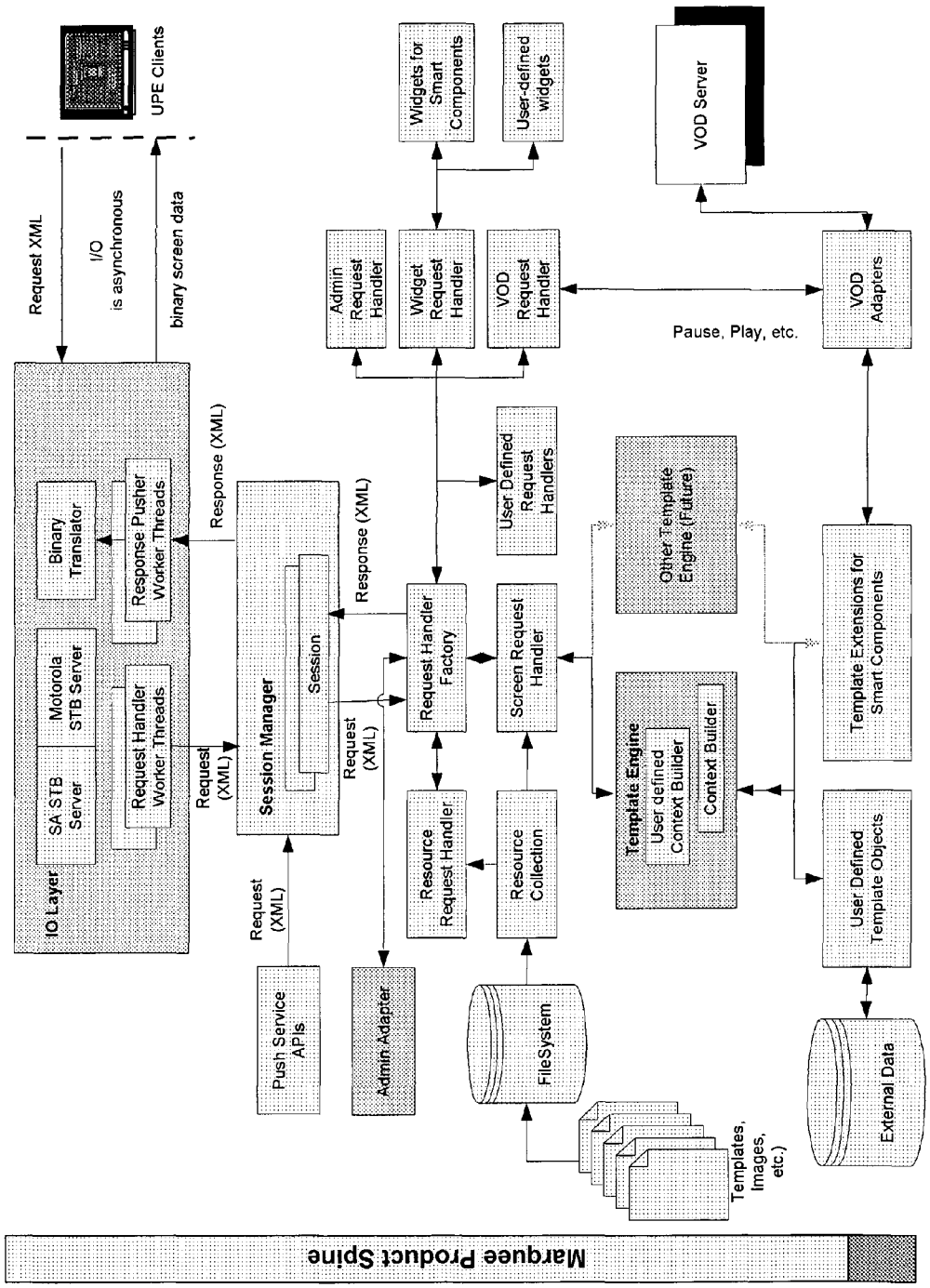
FIG. 10 depicts a more detailed block diagram of the UPE Server architecture in accordance with the present invention.
Figure 18:
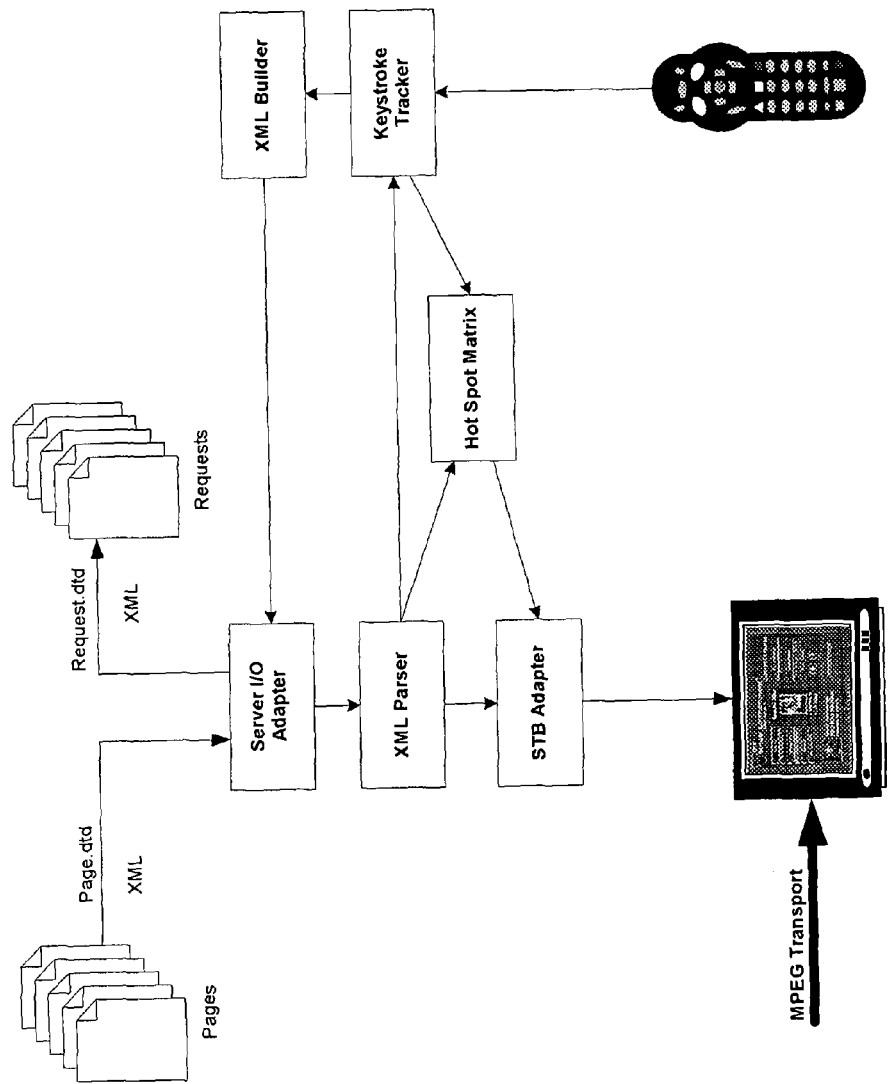
FIG. 18 depicts a more detailed block diagram of the UPE Client architecture in accordance with the present invention.

The UPE is a scalable software platform that provides the majority of the interactivity associated with a user interface. The UPE enables cross-platform presentation of user interfaces and interactive services. The UPE is comprised of a "lightweight" UPE Client 180 running on a STB 190 and a scalable UPE Server 140 running in the network operator location as shown in FIG. 3. FIG. 9 depicts a block diagram of the UPE architecture in accordance with the present invention. FIG. 10 depicts a block diagram of the UPE Server architecture in accordance with present invention. FIG. 18 depicts a block diagram of the UPE Client architecture in accordance with the present invention.

The UPE Server 140 provides a translation layer between the on-screen user interface presented by the UPE Client 180 and the back-end infrastructure made up of the head-end, the VOD Server/System 160, and other applications. The translation layer is comprised of Smart Components 130, discussed in more detail below, which are a set of object control functions which can be visually represented on-screen or perform non-visual system functions.

STB 190 typically provides the following capabilities: manipulation and presentation of MPEG transport streams; reception of generic data streams either in-band or out-of-band; presentation of text and graphics over the MPEG video with appropriate support for alpha blending; low latency back channel communication with the head-end via an out-of-band data connection; and support for third party application integration with the resident application (usually the interactive program guide).

UPE Client 180 works within the capabilities of the STB 190 itself to implement several basic features including: presentation of an MPEG video stream or MPEG still image; presentation of textual and graphical information overlaid upon the MPEG: navigation of on-screen hot spots defined in data received along with the MPEG; responding to the focus, blur, action, and idle scripts associated with each hotspot, and transmission of data back to the UPE Server 140. The relative simplicity of the UPE Client 180 makes its development and migration to other STB 190 environments simpler and enables cross-platform presentation of interactive experiences.

UPE Client 180 is a STB application responsible for the presentation of a user interface and the management of the user's interactions with features of the UI. The UPE Client 180 accomplishes these functions by abstracting the user interface as a set of independent, but interrelated layers. The layers include logical layers (e.g., screen template and hot spot map) and visual layers (e.g., hot spot highlight, text overlay, graphic overlay, and MPEG background). Visual layers represent all the visual aspects of the user interface, including background images, textual and graphical overlays, and hot spot highlights. If a layer presents something visual to the viewer, it is a visual layer. Logical layers represent control information that is used for layout, navigation, and interactivity purposes.

Figure 6A:
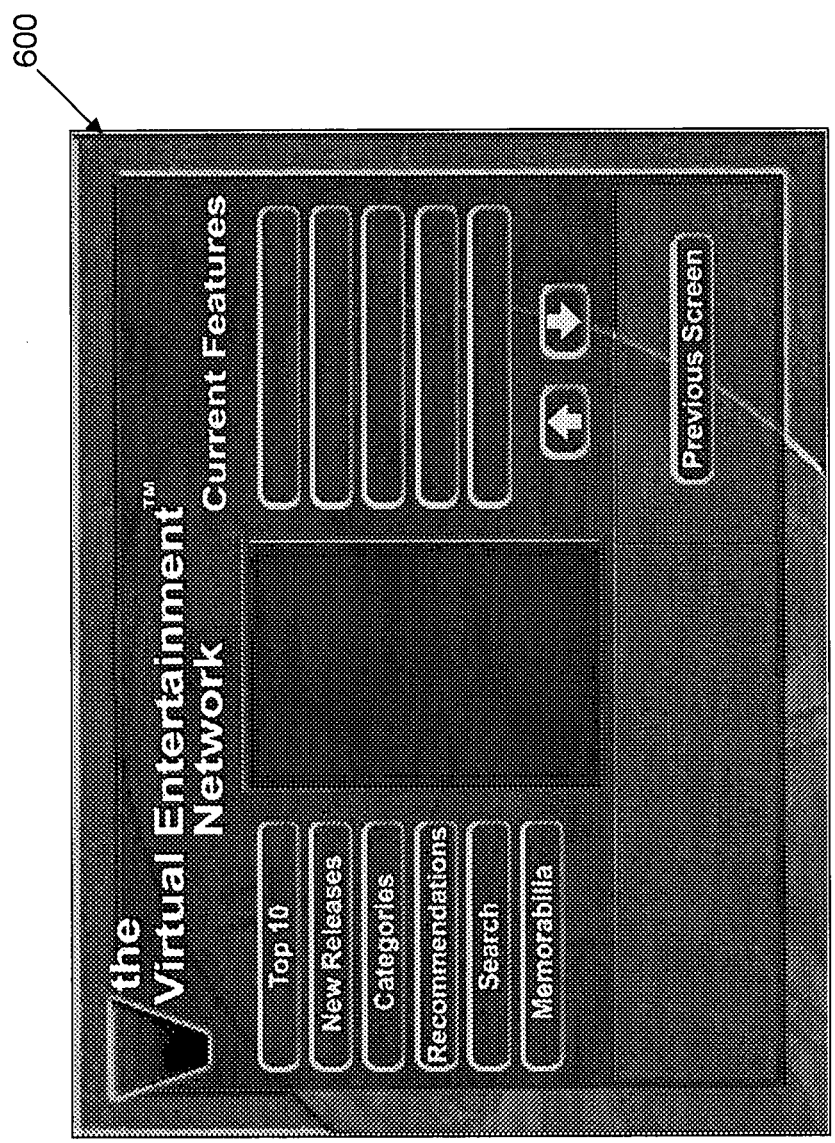
FIG. 6A depicts an MPEG Background layer in accordance with one embodiment of the present invention.

The MPEG Background layer is a visual layer which can typically provide the majority of the on-screen user interface presentation. The MPEG Background layer can comprise an MPEG still image or MPEG video. FIG. 6A depicts an example MPEG Background layer 600. Utilizing MPEG as the primary mechanism for rendering the user interface provides a rich television-centric experience for the viewer. Using MPEG stills, specially encoded bitmap images, provides a simpler method of authoring new user interfaces. User interface designers can progress from the storyboard layout of their user interface design to a UPE client by converting their images to MPEG and creating the other necessary layers. Using MPEG video as the background provides the richest form of user interface development. Leveraging full 30 fps video provides a high quality, television-centric video-enabled UI that keeps the viewer engaged and entertained.

Figure 6B:
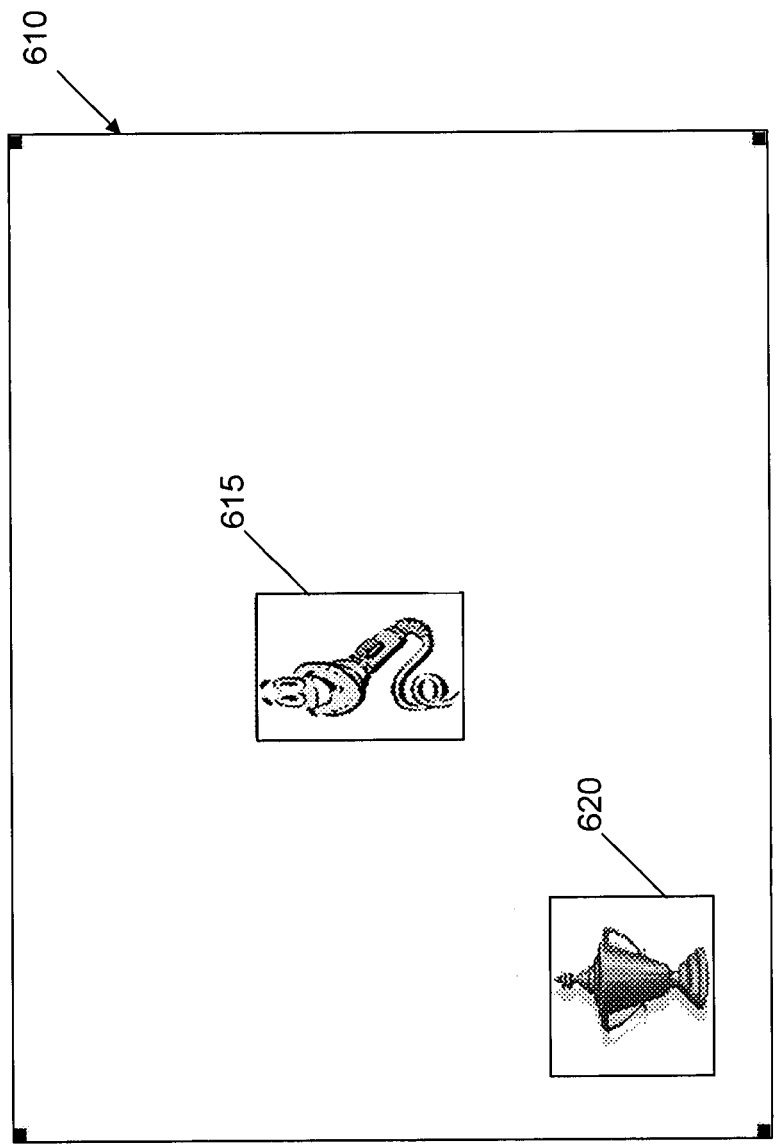
FIG. 6B depicts a Graphic Overlay layer in accordance with one embodiment of the present invention.

The Graphic Overlay layer provides a simple way to augment the MPEG background with context sensitive graphics. FIG. 6B depicts an example Graphic Overlay layer 610. Graphic Overlays 615 and 620 are bitmap images presented on top of the MPEG Background. They provide a means of supplementing the MPEG Background with graphical information related to a particular screen. For example, a movie's meta-data typically includes an image of the movie poster. The image is displayed in conjunction with the movie's other metadata. In this case, the user interface is cross-selling an award related movie package and a past award winner. The graphic overlay layer works in conjunction with the text overlay layer to complete the content augmentation of the MPEG background layer 600.

Figure 6C:
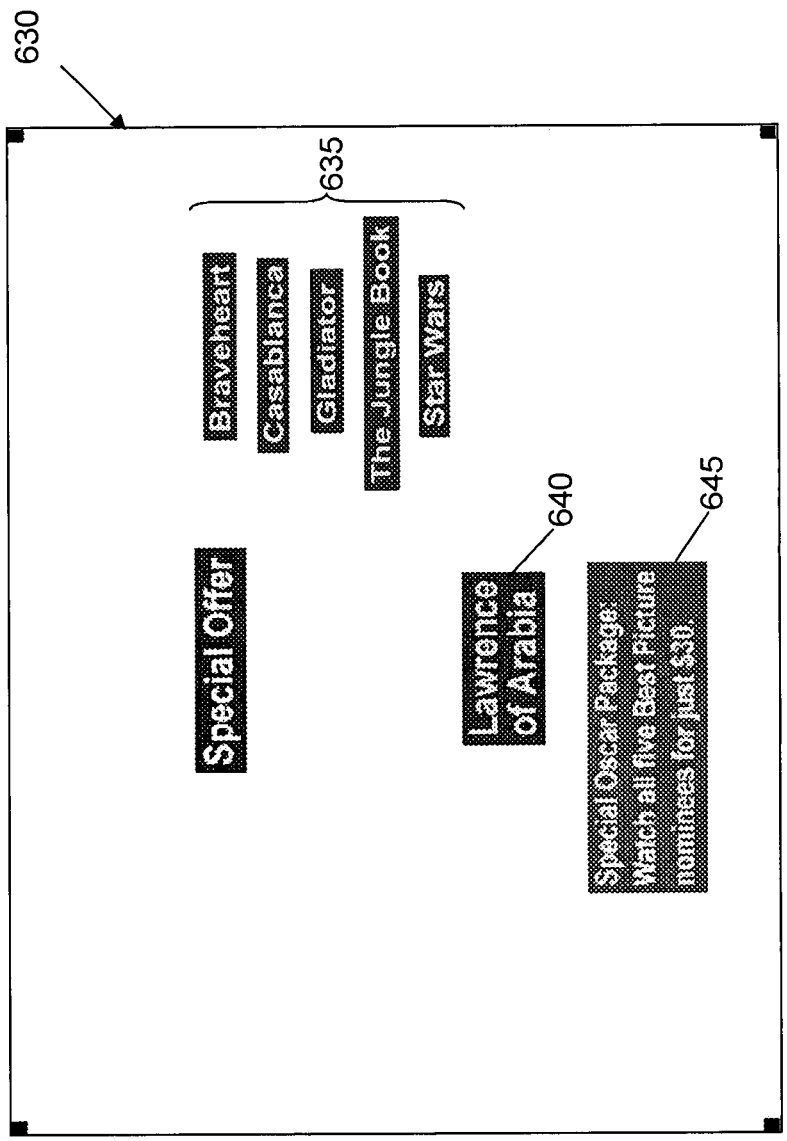
FIG. 6C depicts a Text Overlay layer in accordance with one embodiment of the present invention.

The Text Overlay layer is a visual layer comprising formatted text and is typically presented on top of the Graphic Overlay layer or the MPEG Background layer. FIG. 6C depicts an example Text Overlay layer 630. The Text Overlay layer provides a mechanism to display contextual data related to the particular screen being presented. For example, a list of movies 635 can be rendered with Text Overlay layer 630.

The Text Overlay layer provides the most freedom in varying on-screen content. For example, as shown in FIG. 6C, a Scrolling List 635 of movies available for purchase can be provided, along with advertisements 640 and 645 which cross-sell award-related movie packages. The Text Overlay layer works in conjunction with the Graphic Overlay layer to complete the content augmentation of the MPEG Background layer.

Figure 6D:
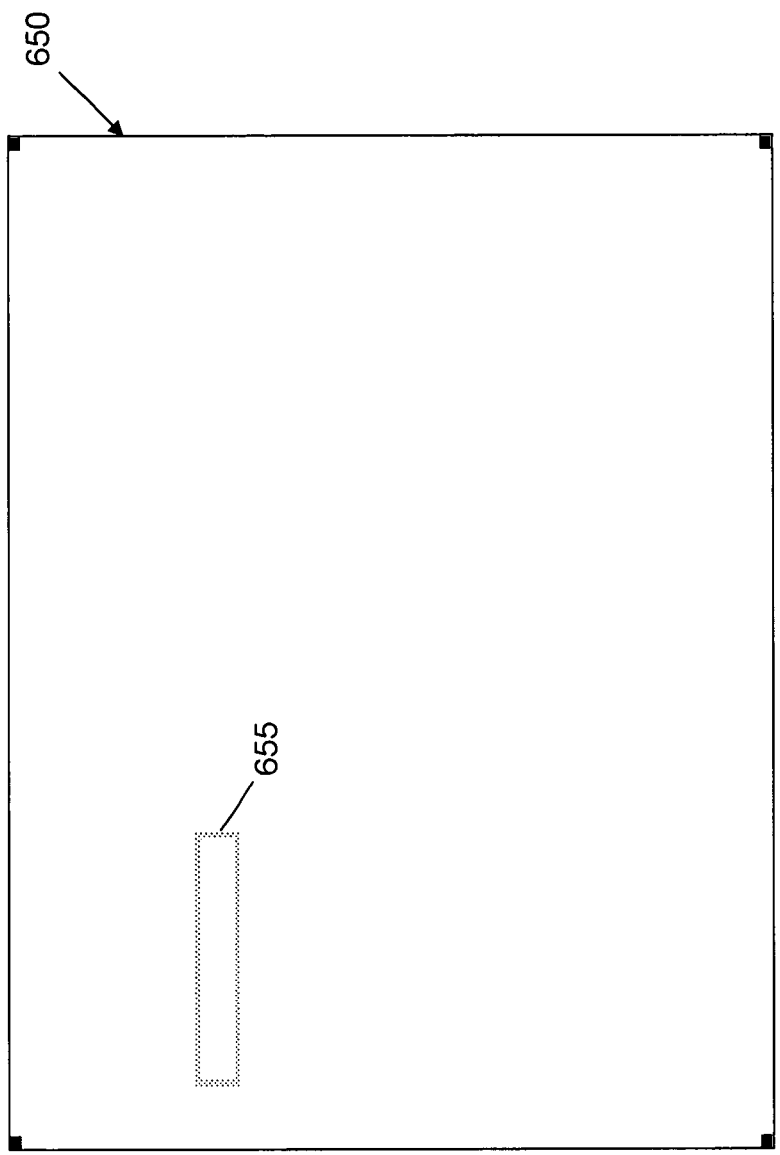
FIG. 6D depicts a Hot Spot Highlight layer in accordance with one embodiment of the present invention.

The Hot Spot Highlight layer indicates visually which user interface feature that a viewer has highlighted. The UPE Client 180 controls the Hot Spot Highlight layer. FIG. 6D depicts an example Hot Spot highlight layer 650. FIG. 6D depicts a simple colored rectangle as the Hot Spot Highlight 655, although it will be appreciated by those of skill in the art that other configurations are within the scope of the present invention. The Hot Spot Highlight 655 is an on-screen cursor, providing the viewer a means to interface with the user interface features. Each hot spot determines how it is to be highlighted. In the present example, a hot spot is highlighted by drawing a colored rectangle around it. As the viewer presses the appropriate remote control buttons, the highlight can be moved from one hot spot to another, as defined in the Hot Spot Map.

Figure 6E:
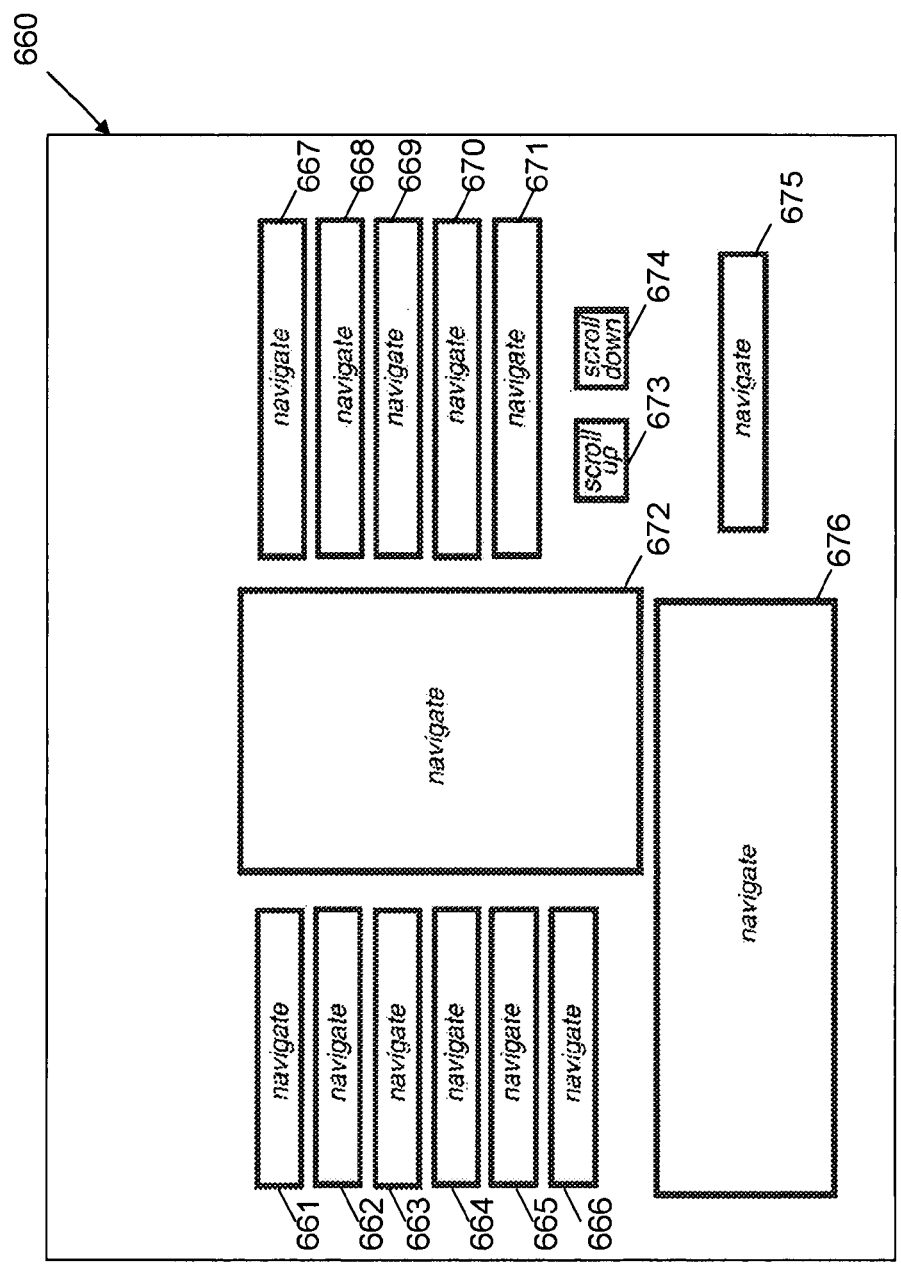
FIG. 6E depicts a Hot Spot Map layer in accordance with one embodiment of the present invention.
Figure 6F:
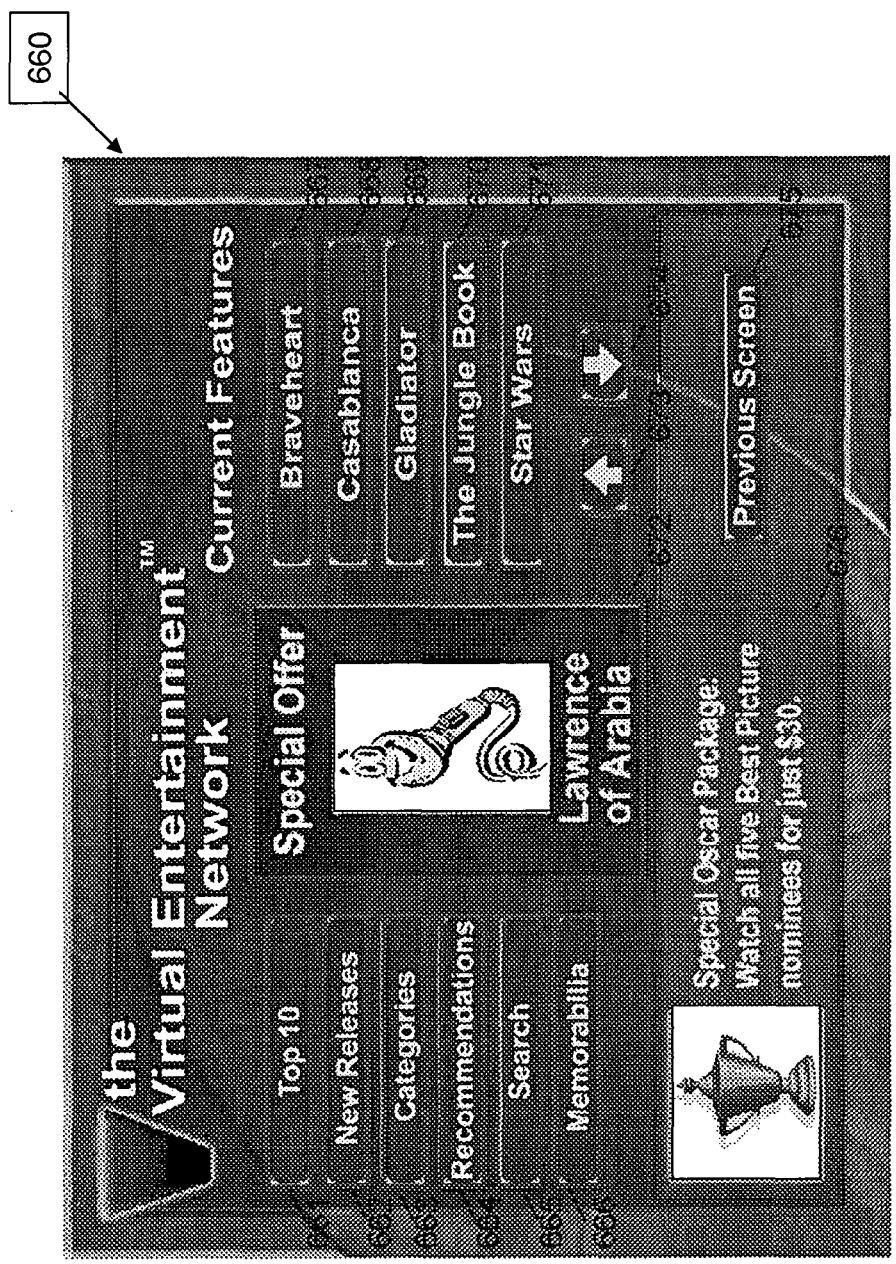
FIG. 6F depicts a Hot Spot Map layer superimposed on-screen in accordance with one embodiment of the present invention.

The Hot Spot Map layer is a logical layer that describes the physical location and highlight method of each on-screen hot spot. FIG. 6E depicts an example Hot Spot Map layer 660. Each hot spot (661, 662, 663, 664, 665, 666, 667, 668, 669, 670, 671, 672, 673, 674, 675, and 676) represents an area of a screen that is selectable by the viewer. Typically the viewer uses the remote control to move a highlight cursor around the screen. Each area of the screen that is highlighted as the user presses the buttons on the remote is a hot spot. Each hot spot is associated with a particular action. For example, a hot spot may be labeled New Releases, and the associated action would be navigate. When a viewer selects the New Releases hot spot, the user interface presents the New Releases screen, which is considered navigating the user interface. FIG. 6F depicts the Hot Spot Map layer 660 superimposed on-screen.

Figure 6G:
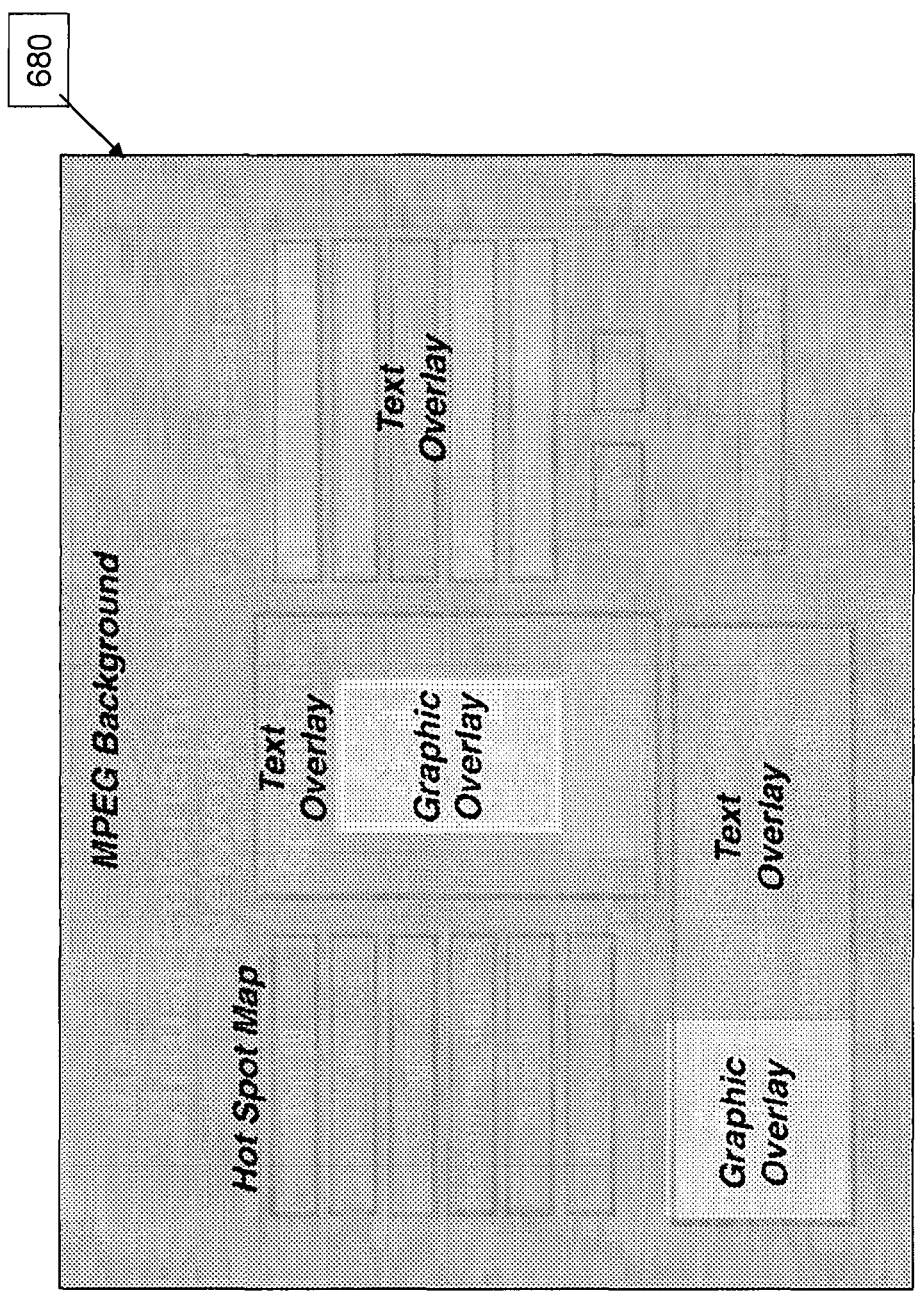
FIG. 6G depicts a Screen Template layer in accordance with one embodiment of the present invention.

The Screen Template layer is a logical layer that represents the logical layout of an individual screen of the user interface. FIG. 6G depicts an example Screen Template layer 680. The Screen Template layer 680 provides a container for other layers, including the Hot Spot Map layer 660, Text Overlay layer 630, Graphic Overlay layer 610, and MPEG Background layer 600. The Screen Template layer 680 is the only layer that directly contains and manages visual layers. The Screen Template layer 680 provides a mechanism to describe a generic screen that is populated by associated asset queries. For example, the screen describing a particular movie is typically implemented as a template. The layout and navigation can be the same regardless of the movie being presented; however, the data about the movie, including description, ratings, image, price, etc., changes. The support of dynamic data-driven templates drastically reduces the number of screens necessary to fully render a user interface and provides significant speed and flexibility in the creation and presentation of user interfaces.

Figure 6H:
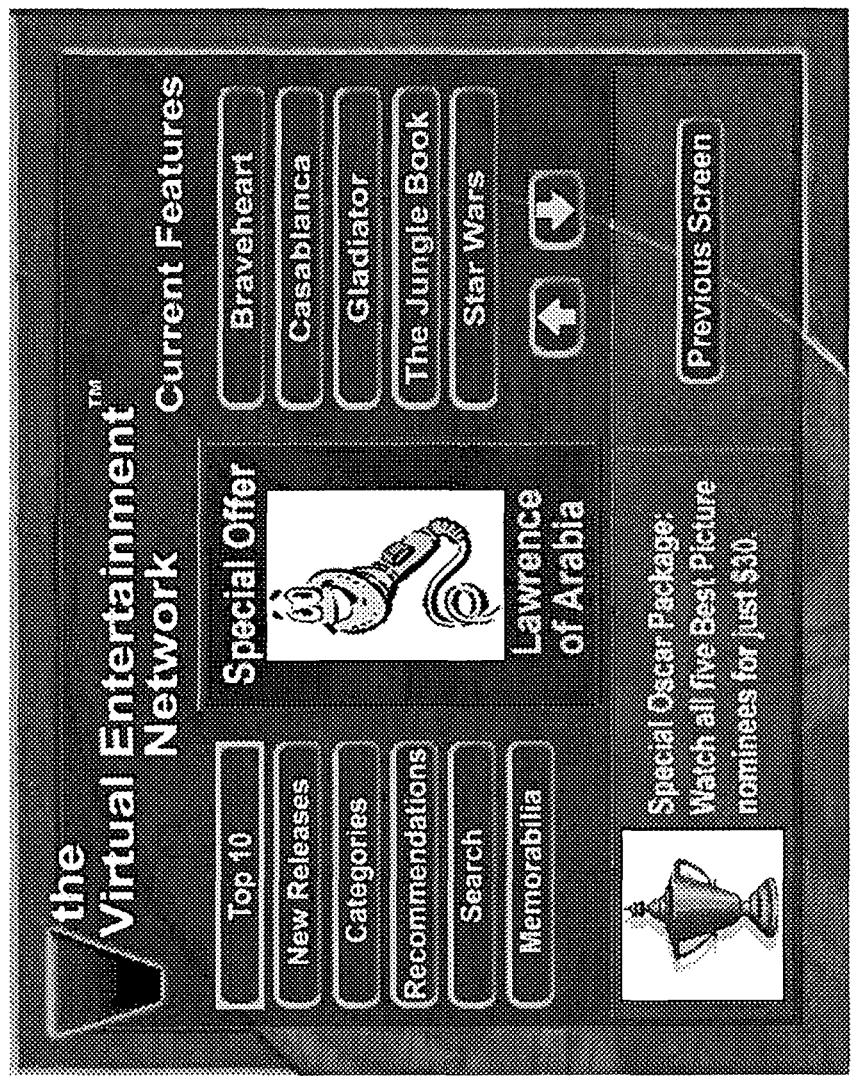
FIG. 6H depicts a composite of visual layers in accordance with one embodiment of the present invention.
Figure 7A:
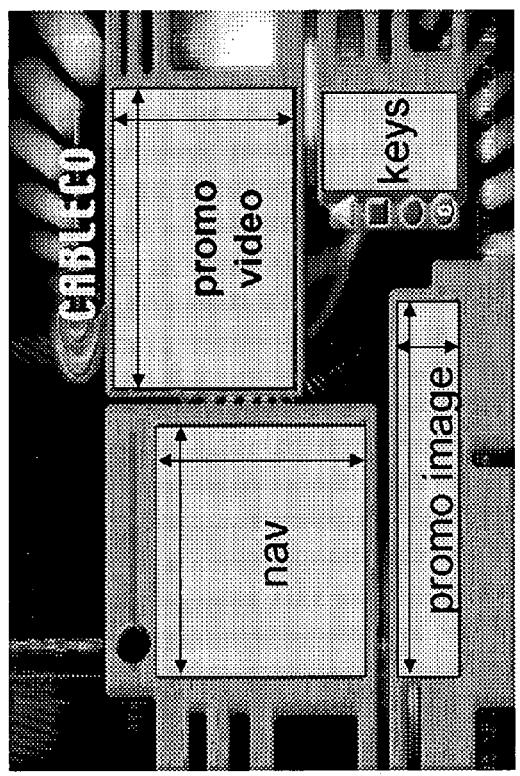
FIGS. 7A and 7B depict exemplary user interface screens in accordance with another embodiment of the present invention.
Figure 7B:
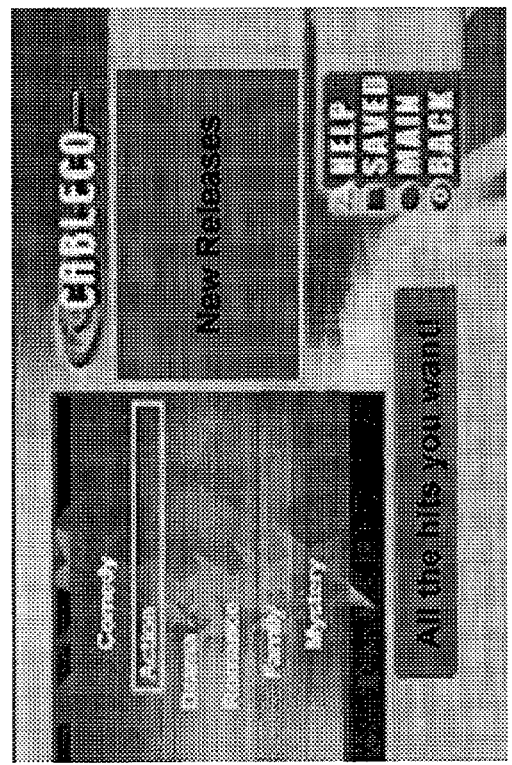

FIG. 6H depicts an exemplary on-demand user interface presented by the UPE when combining the above-described layers 600, 610, 630, 650, 660 and 680. While the graphics shown in FIG. 6H are merely representations of a user interface, user interface designers are free to apply full creative license toward their idea of an optimal user interface. It will be appreciated by those of skill in the art that other design layouts and configurations can be supported. For example, alternative examples of user interfaces are depicted in FIGS. 7A and 7B. FIG. 7A depicts a potential screen layout which comprises an MPEG video background layer and areas for title or service navigation, promotional videos, promotional images, and keys mapped to remote buttons. FIG. 7B depicts an exemplary screen presented on the end-user's presentation device and viewed by the end-user.

FIG. 8A depicts an exemplary screen displayed on the presentation device and viewed by the end-user who has tuned into a program after the program has already begun. In this example, the program is a movie; however, it will be appreciated by those skilled in the art that a wide variety of other types of programs are within the scope of the present invention. As shown in FIG. 8A, the end-user is presented with a pop-up banner 800 comprising graphics and text which offers to allow the viewer to watch the program from the beginning by way of a particular Content Provider Company's on-demand service. In the background of the screen, the movie that is already in progress is being shown.

By accepting the offer to watch the program from the beginning (by, for example, pressing the SELECT key on the viewer's remote control device), if the viewer is not currently a subscriber to the Content Provider Company's on-demand service, then the viewer's presentation device can display a screen 810 as shown in FIG. 8B, which presents an offer to subscribe to the Content Provider Company's on-demand service.

Figure 8C:
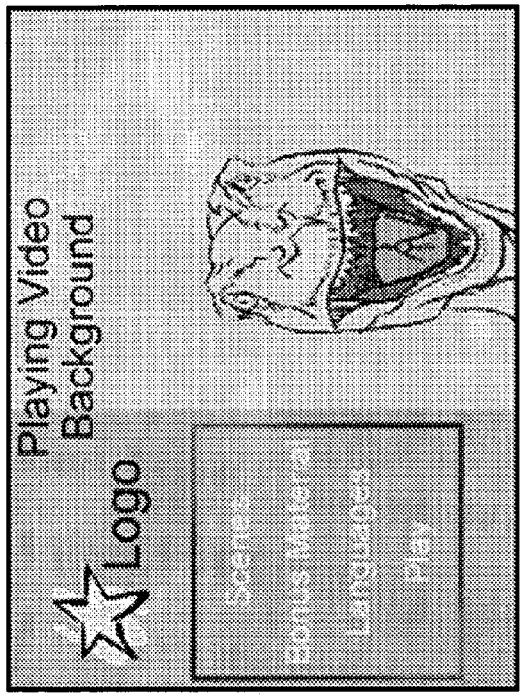

By accepting the offer to subscribe (by, for example, navigating to and selecting the "Subscribe Now" hot spot), the viewer can then view a virtual DVD menu on his or her presentation device, such as shown in FIG. 8C. The menu shown in FIG. 8C provides feature options from the DVD including Scenes, Bonus Materials, Languages, and Play. The menu can include full motion video, still images, audio, graphics, and text as created by the DVD designers. The background or foreground can also be modified such as including a logo of the Content Provider or Network Operator.

Figure 8D:
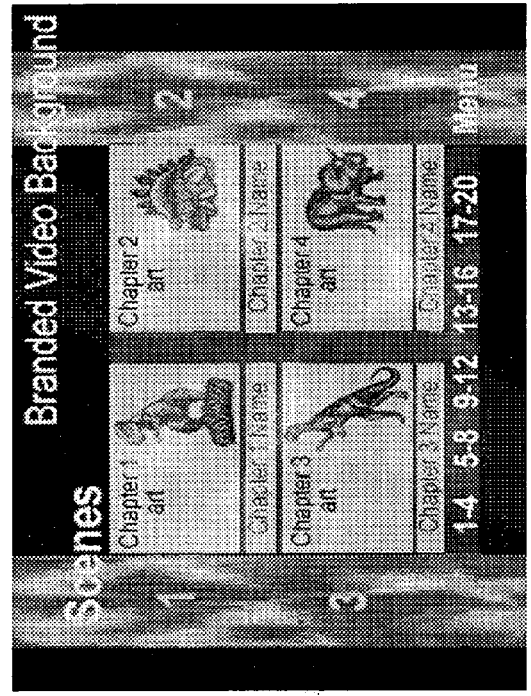

By selecting the "Scenes" hot spot from the menu, the viewer can then be presented with a virtual DVD scene selection menu such as shown in FIG. 8D, which allows the viewer to select and view any of a plurality of scenes. The menu can include full motion video, still images, audio, graphics, and text relating to each scene as created by the DVD designers. When the viewer selects a particular scene, the presentation device can display the video corresponding to that particular scene.

Figure 8E:
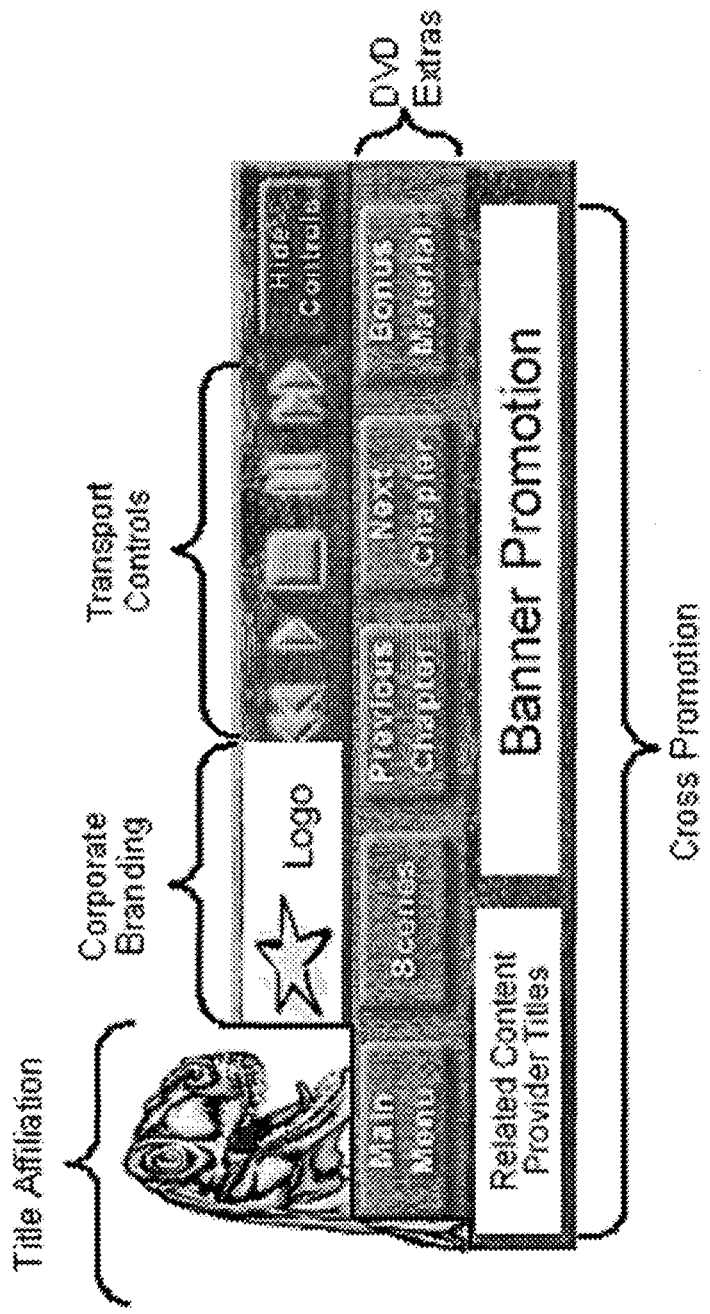
FIG. 8E depicts an exemplary navigation bar in accordance with one embodiment of the invention.

FIG. 8E depicts an exemplary navigation bar which can comprise a DVD Title Affiliation, Branding, Transport controls (e.g., rewind, play, stop, pause, and fast forward), DVD extras (e.g., Main Menu, Scenes, Previous Chapter, Next Chapter, and Bonus Material), and Cross-Promotion Merchandising Offers such as Related Content Provider Titles and Banner Promotions, for example. For example, if the current program is the movie Jurassic Park III, the Related Titles may be Jurassic Park I and Jurassic Park II or other movies from the same or similar genres. The Banner Promotion may display advertising content for goods and services which may be related to the movie. For example, the Banner Promotion can display an ad for products featured in the movie or for CDs, DVDs, and VCR tapes related to the movie. The navigation bar depicted in FIG. 8E is an illustrative example, and it will be appreciated by those skilled in the art that alternative configurations are within the scope of the present invention.

The UPE provides various methods of managing network utilization as detailed herein. The UPE is network independent and flexibly supports the different data paths supported by various network infrastructures. For instance, in the typical digital cable network environment data paths can be a forward path and/or a reverse path. Forward paths transmit data over the network to the STB 190 while reverse paths transmit data from the STB 190 over the network. Another dimension of a data path relates to its modulation method. A data path can be either in-band or out-of-band. Due to the asymmetric nature of a cable network, in-band paths are only forward paths. Out-of-band paths can be forward or reverse paths. It should be noted that the only reverse path is an out-of-band path. A cable network offers multiple mechanisms for sending data via the forward/reverse paths and in-band/out-of-band paths. The methods include data packets in an MPEG transport, TCP/IP, UDP/IP, and data carrousel. Note these are not the only methods but those typically utilized by the UPE in a digital cable network.

The UPE does not merely utilize data paths to produce its rich television-centric user experiences. It relies heavily upon MPEG transport streams containing digital video and audio. There are two methods of transmitting an MPEG transport to a STB 190, either broadcast or session.

The first method, a broadcast, is the basic digital channel, modulated on a particular frequency, identified with a particular program ID (PID). This broadcast is either visible (i.e., found in the channel lineup) or hidden (i.e., only known to the system). Under either method, STBs 190 can be directed to present the broadcast to a viewer's television (depending on conditional access, the discussion of which is beyond the scope of this section). All STBs 190 typically present the same content found in the broadcast but can present viewer specific data received over any of the data paths.

The second method, a session, is a dedicated digital channel provisioned to a particular STB 190. Like a broadcast, the session is modulated on a particular frequency and identified with a particular PID. Unlike a broadcast, the session is dedicated to a particular STB 190. Sessions form the basis of VOD. The UPE leverages existing VOD Server/System 160 infrastructure to utilize sessions for the user experience it presents. It should be noted that unique sessions are a limited resource in any network and efficient utilization of them is a requirement taken into heavy consideration by the UPE. Accordingly, it should also be considered by the creators of the UI designs presented by the UPE. Having both broadcasts and sessions at its disposal, the UPE offers flexible utilization of bandwidth and other network resources.

The architecture of the UPE has been developed to operate with or without middleware software added to the STB 190. The UPE can operate native without middleware on any digital STB capable of supporting VOD including, but not limited to, Scientific-Atlanta Explorer 2000 with SARA digital navigator and Motorola DCT2000 with the TV Guide interactive program guide. In the case where middleware is deployed, the UPE can provide two choices of interoperability. The UPE can either coexist or be integrated with the middleware. The following discussion enumerates the more popular middleware solutions and discusses the method of interoperability potentially utilized by the UPE.

In general, middleware comes in two varieties: browser-based and programmatic. Browser-based middleware solutions utilize an HTML browser to present the user interface to the viewer. Depending on the middleware, the browser either executes directly on the STB 190, or on an application server in the head-end. In the latter case, pages rendered by the browser are delivered to the STB 190 as an MPEG stream and controlled by a client. Browser-based middleware typically relies on a proxy web server executing in the head-end. This type of middleware is commonly utilized for "walled gardens" and "web on the TV" applications. It is preferable for the UPE to coexist with browser-based middleware solutions. Programmatic middleware provide a set of APIs that encapsulate and abstract native STB 190 operating systems and APIs. In theory, an application developed on a programmatic middleware will work on any STB 190 that supports that middleware. In most cases, the UPE would be integrated to work on top of the middleware APIs.

Smart Components

Each Smart Component 130 is a collection of objects that work in conjunction with the UPE and other systems. One such example of a Smart Component 130 would be a Pause object. On the television-screen, the UPE Client 180 presents a graphical element the viewer would recognize as a pause button. On the UPE Server 140, the corresponding control function is responsible for pausing the current video stream. When the viewer selects the on-screen pause button, the UPE Client 180 highlights the button and transmits the selection to the UPE Server 140. The UPE Server 140 Pause object communicates the request to the VOD Server/System 160, which ultimately pauses the video. These objects also provide an abstraction layer, discussed in more detail below, between the UPE Client 180 and the underlying VOD Server/System 160 solution, delivering a simple migration path to support multiple VOD Server/System 160 suppliers.

Figure 13:
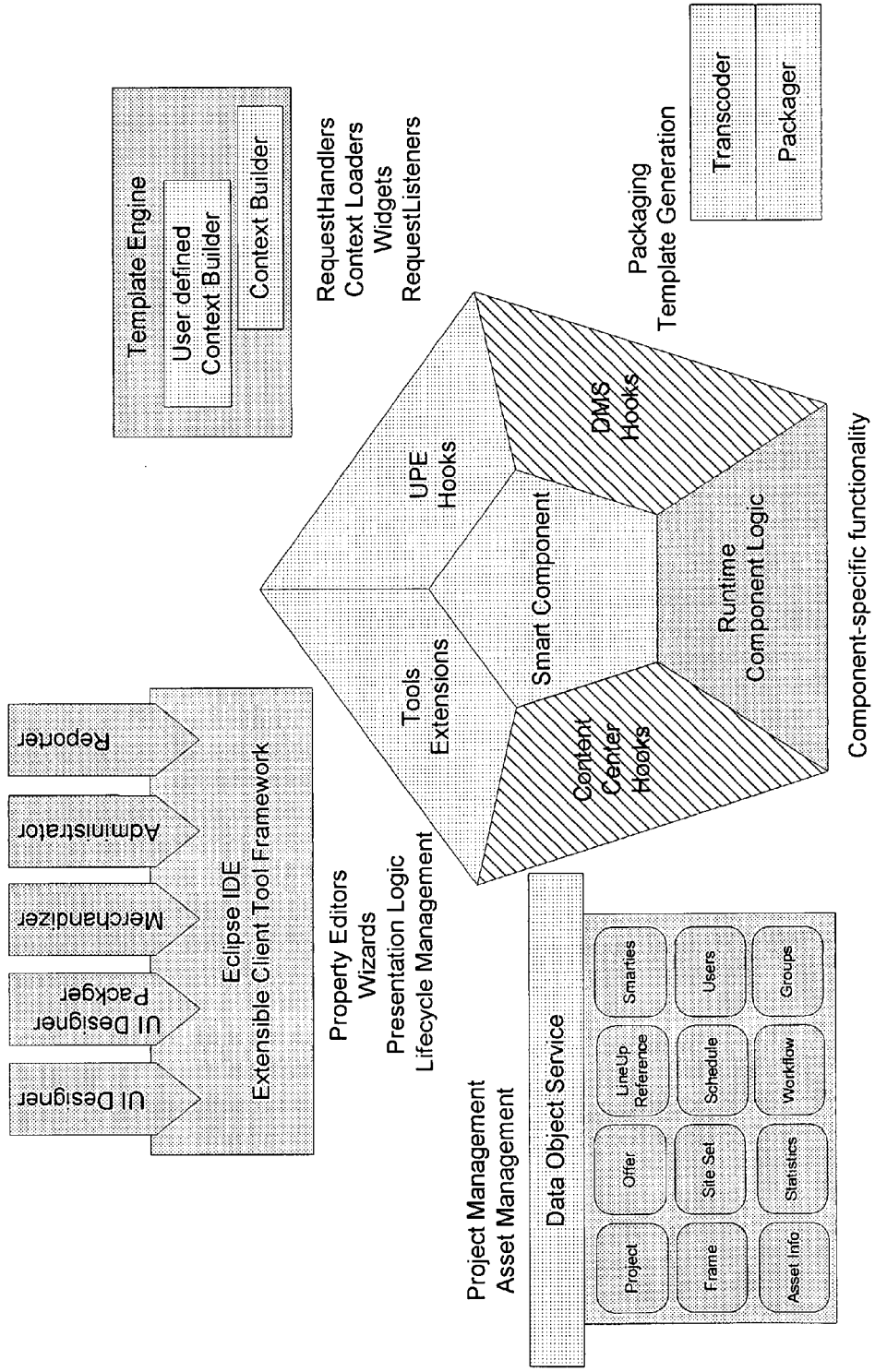
FIG. 13 depicts a more detailed block diagram of the Smart Component architecture in accordance with the present invention.

Each Smart Component 130 is built on a well-defined object-oriented foundation. The Smart Component foundation leverages Java technology to enable Smart Component 130 integration with the UPE Server 140 and UI Designer 120. FIG. 13 depicts a more detailed block diagram of the Smart Component architecture.

Through a concise set of interfaces, abstract classes, and base classes, the foundation provides the hooks necessary for accurate and productive development of new Smart Components 130. The foundation defines and controls the runtime lifecycle of Smart Components 130 by: providing a Java Bean interface; allowing Smart Components 130 to be associated with menu frames via user-friendly GUI tools; and providing a well-defined XML description of an instance of a Smart Component 130.

The XML description is utilized by the foundation to generate templates that instantiate instances of Smart Components 130 at run-time; providing a mechanism for transcoding an instance of a Smart Component 130 for instantiation in a particular targeted UPE or UI Designer 120 environment. Parameters defining an environment include head-end type, VOD environment, and STB 190 type; providing a standard means of dynamically linking the objects into the Java Runtime Engine (JRE) via the Smart Component Linker/Loader; instantiating particular Smart Components 130 via the Smart Component Factory; providing a set of well-defined UPE extension hooks on which Smart Components 130 can attach themselves; and, integrating with third party data adapters. These facets of Smart Component 130 anatomy provide a solid foundation for extending the functionality of the UPE or UI Designer 120 in a manner consistent with industry accepted best practices and application of sound design patterns.

Figure 5:
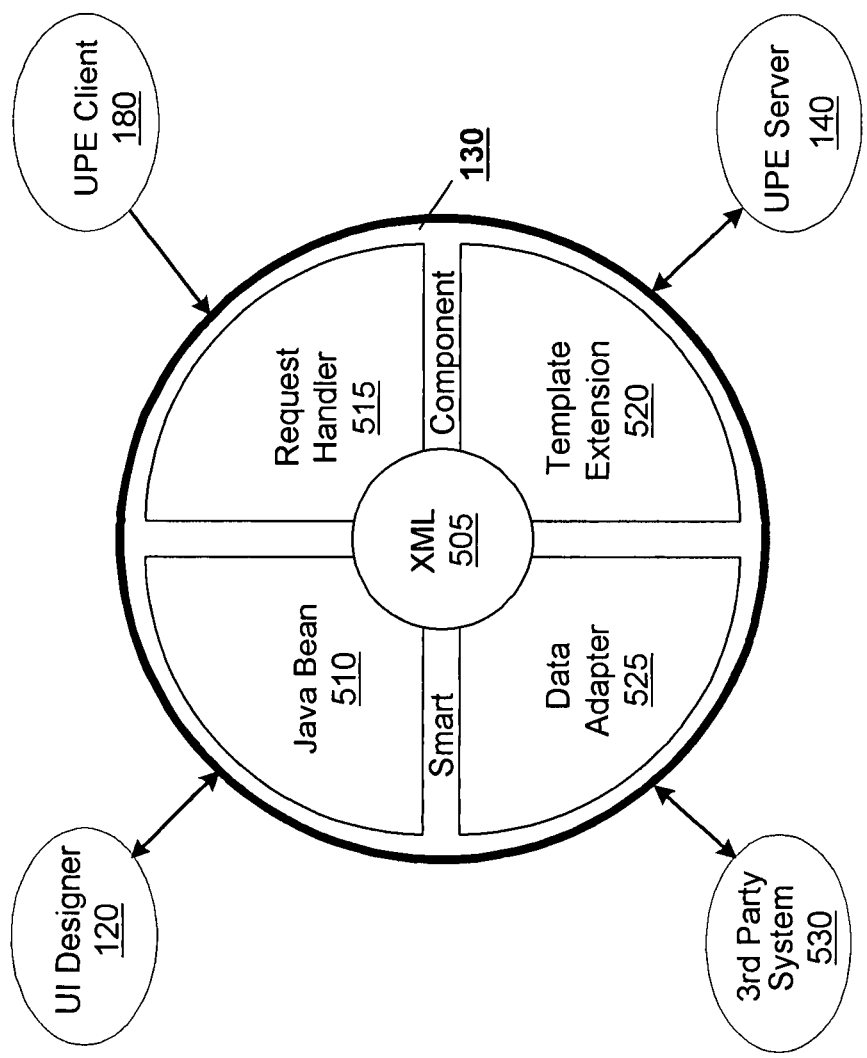
FIG. 5 depicts a block diagram of a Smart Component in accordance with the present invention.
Figure 14:
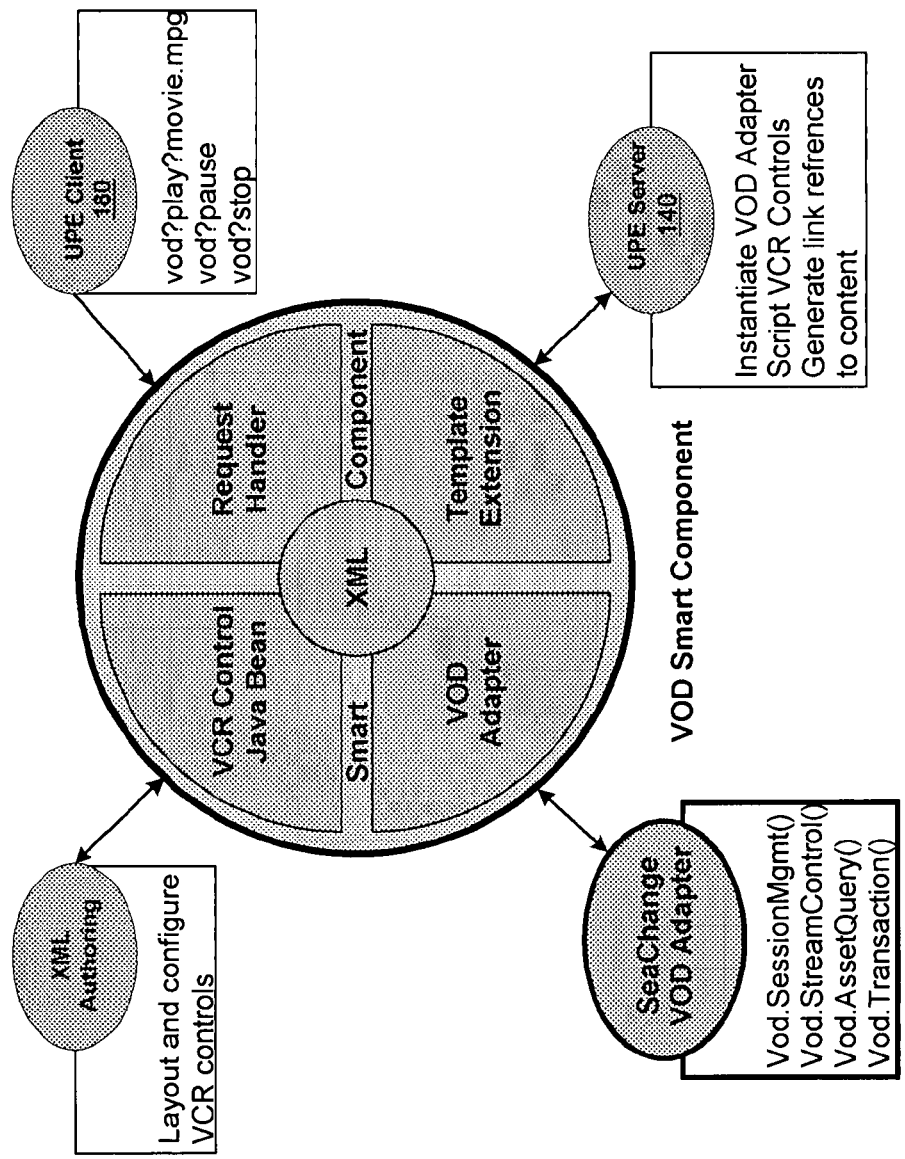
FIG. 14 depicts a more detailed diagram of a VOD Adapter/Smart Component in accordance with the present invention.
Figure 16:
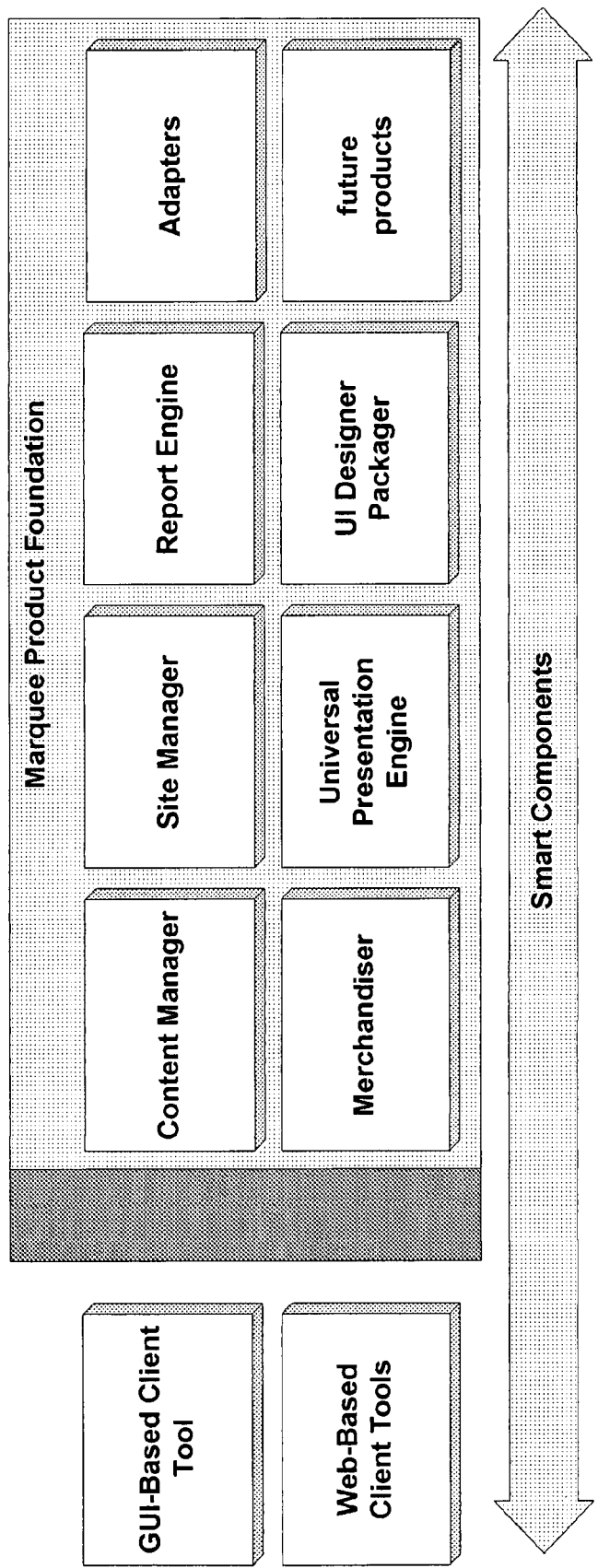
FIG. 16 depicts a block diagram of Smart Component Extensibility across the Marquee Product Foundation and related products.

A block diagram depicting the functional areas of a Smart Component 130 is shown in FIG. 5. A block diagram depicting the high level architecture of a VOD Adapter Smart Component is shown in FIG. 14. A block diagram depicting a more detailed architecture of a Smart Component is shown in FIG. 13. A block diagram depicting Smart Component providing extensibility of the Marquee foundation is shown in FIG. 16 Each Smart Component 130 comprises several Java objects and a well-defined XML document 505 describing its structure and properties. Each Smart Component 130 preferably shares a common design and foundation with all other Smart Components 130, enabling rapid development and quick support for new applications.

Each Smart Component 130 optionally implements a standard Java Bean 510. The Java Bean 510 allows the Smart Component 130 to be defined and manipulated by GUI design tools like the UI Designer 120. The Java Bean 510 provides a standard method of discovering, accessing and setting the particular properties associated with the Smart Component 130. Since Smart Components 130 are implemented using a standard Java Bean interface 510, standards such as Long Term Persistence for Java Beans can be utilized to persist a Smart Component 130 configuration and association with other Smart Components 130 within menus and frames. Smart Component Java Beans 510 are also responsible for generating templates that are rendered by the UPE Server 140. These templates contain the presentation logic of the component and the necessary logic to call the other parts of the Smart Component 130 during runtime.

Each Smart Component 130 optionally implements a request handler 515. For instance, the request handler 515 extends the UPE Server's 140 capability to process requests from UPE Clients 180. The requests directly relate to processing key presses made by the viewer, utilizing a particular frame of a menu.

Each Smart Component 130 optionally implements a template extension 520. Templates associate external data with a particular frame of a menu. Templates also provide all the dynamic capabilities of menus. The template extension 520 creates a standard plug-in for the template engine. Once instantiated, menu frames access Smart Component methods via template scripts. The template scripts are interpreted by the template engine which invokes the new methods included in the template extension plug-in.

Each Smart Component 130 optionally implements a data adapter 525. The data adapter 525 provides access to third party systems 530 and databases. Optimal data exchange is accomplished via XML documents. The data adapter 525 can also encapsulate various types of API or data exchange formats in existence today (e.g. COM objects, DLLs, shared libraries, etc).

Each Smart Component instance is described as an XML document 505 that enumerates and defines its properties and the relationship between the other facets of a Smart Component 130. The XML description provides a loose coupling between the facets, offering an abstraction layer between them. This abstraction layer allows any facet of a Smart Component 130 to change without affecting others, allowing future Smart Components 130 to take advantage of technological advances from the Java development community.

Smart Components 130 greatly reduce development time and cost by moving development from the native STB environment to a highly efficient configuration effort. Smart Components 130 can be highly configurable and can change properties and operating characteristics based on data supplied at design time from configuration tools such as UI Designer 120 or during run time in response to data provided from external sources such as databases, etc.

The following discusses Smart Components relevant to creating the DVD on-demand experience. Additional Smart Components are discussed below.

The Button smart component represents a navigable spot on the screen, also known as a hot spot. A Button has the following attributes: location on a Frame (x, y); size (width, height); rendering via focus, blur, action, and idle timeout scripts; images and/or text. Every button found on a DVD title is represented by a Button smart component.

The Frame smart component represents a particular page of a menu. A Frame aggregates all other components. A Frame provides properties inherited by other components on the page. Every individual interactive menu found on a DVD title is represented by a Frame smart component. All the other Smart Components needed to represent the DVD interactive menu are contained within a frame.

The Key Map smart component maps remote control keys to action events. The keys can be any key event generated by the STB. The action events include sending the key back to the server, changing focus to a particular button, and directional navigation. There is one Key Map per Frame. The DVD remote control has a standard set of keys that provide a standard set of functionality. The majority of the keys found on a DVD player remote control are found on digital cable (STB) remote. Each Frame generated during the ingestion process utilizes a standard Key Map configuration. The Key Map can be adjusted using the UI Designer during the Association step of the ingestion process.

The following Table 6 identifies key map applied to Frames:

TABLE 6

Key Mapping

| DVD Player Key | Set-top Box Key | Description |
| --- | --- | --- |
| D-Pad | D-Pad | Provides up/down/left/right directional arrows and an action button usually labeled SELECT, ENTER, or OK. |
| DVD Transport | VCR Transport | Provides typically VCR functionality including play, pause, stop, fast forward, and rewind. The DVD transport also includes chapter forward and chapter back. The chapter seek keys are typically not found on set-top box remote controls. This DVD functionality is accessed via on screen buttons. |
| Numeric Keys | Numeric Keys | Allows the user to enter the numbers 0–9. |
| Menu | N/a | The menu key returns the user to the top menu associated with a video title set. An equivalent key does not exist on set-top box remotes, and the functionality is not necessary. |
| Title | Exit | Returns the user to the top Frame associated with the DVD. |
| Return | B Key | Backs out of a menu sequence. |

The Merchandiser smart component creates advertising billboard space on the ingested DVD menu frames. DVD titles do not contain marketing and merchandising information associated with the promotion of on-demand services provided by the network operator. During the Association step of the ingestion process, marketing or merchandising professionals determine the appropriate amount and type of merchandising that is to occur on each menu of the ingested DVD title. Standard merchandising rules can also be applied to a DVD menu set via predefined templates.

The Script smart component provides a mechanism to draw on the screen related to navigation actions. Actions can be initiated by navigating to a link (focus), navigating off a link (blur), selecting a link (action), and idle timeouts (idle) associated with individual links and the current Frame. A Script contains scriptable elements that are rendered, or otherwise executed when the script is activated. Scriptable elements include text, hot spot, image, rectangle, focus change, background video change and a server or client specific request.

For example, DVD titles typically have a chapter index that provides a set of menus to quickly navigate to a particular chapter or scene of the movie. Each menu of the chapter index typically displays a list of links to the other menus in the index. As the user navigates this index, scripts are utilized to change the associated background video and focused hot spot. The ingestion process utilizes Scripts for all the dynamic navigational functionality found on the DVD title. Each Script is associated with the relevant Frame. A Frame can contain more than one script.

The Video Background smart component provides a mechanism to change the background associated with a Frame. DVDs use MPEG video as the background of a Frame. The Video Background smart component allows the Frame to direct the VOD server to play a particular video asset associated with the Frame. Every DVD menu has an associated video background. The ingestion process utilizes the Video Background smart component to maintain that association.

The Video Loop Segment smart component provides a mechanism to loop within a particular segment of video that is associated with a Frame. Often, the video associated with a menu has an introduction segment and a looped segment. The introduction segment is played only once, and the looped segment is continually played while the associated menu is navigated. The ingestion process utilizes Video Loop Segments to express the introduction and looped segments of the menu video.

The VCR Control smart component provides normal VCR trick-play features including play, pause, stop, fast forward, and rewind. The VCR Control smart component utilizes both direct key mapping from the VCR control keys on the remote, as well as, an on-screen VCR transport control. The VCR Control has a standard on-screen transport which can be substituted during the Association step of the ingestion process. The ingestion process associates the VCR Control with the title assets, to provide trick-play during playback.

VOD Adapters represent a special type of Smart Component 130 utilized by the UPE Server 140. The VOD Adapter provides a standard interface to a VOD environment that provides access to typical services including session management, stream control, asset queries, and transaction management. The VOD Adapters leverage a set of foundation objects, providing well-defined access to standard streaming protocols. The UPE Server VOD Adapter foundation supports standard VOD interfaces including: DSM-CC for session management; Lightweight Stream Control (LSC) Protocol for stream control; RTSP for session management and stream control. The video related Smart Components utilize the VOD Adapter to perform their function.

The DVD Juke Box smart component provides a mechanism to associate groups of DVD titles with particular nodes of an overall on-demand portal. The DVD Juke Box provides a container for references to DVD titles having some interesting association. For example, the node of the on-demand portal could be the Family genre of movies. Via the DVD Juke Box smart component, the ingested DVD content of Shrek would be associated with this node. When the viewer selected the Family genre frame, the DVD Juke Box would now list Shrek along with the other titles already configured for the list. Shrek could also be associated with other nodes of the on-demand port, such as the Action or Comedy.

The DVD On-Demand (DVDOD) smart component provides access to all DVD features including, chapter index, parental controls, camera angles, and dynamic story branching. Utilizing the XML files generated during the ingestion process, the DVDOD smart component provides functionality to various Concero Marquee components. Smart Components are Object-Oriented, and the DVDOD smart component utilizes this feature by deriving itself from the VCR Controls smart component. Doing so, allows it to inherit all the behavior of the VCR Controls, eliminating the need to duplicate the functionality. The DVDOD Smart Component delivers the additional functionality beyond VCR Controls requisite to enabling the user to access enhanced DVD features.

Many other Smart Components can be used to create user interfaces and interactive experiences. Smart Components can be bundled as a set of libraries or individually. Some examples of typical libraries include: Basic, Containers, Navigation, VOD Controls, Data Entry, Data Retrieval, Transactions, and Merchandising which are described in more detail below.

Basic smart components provide atomic screen elements used for basic static rendering.

TABLE 7

Basic Smart Components

| Component | Description |
| --- | --- |
| Beep | A reference to a downloaded Sound. Provides the event associated with playing the Sound. Multiple Beep components can reference the same Sound component. |
| Circle | A definition of a circle shape to be drawn on the screen. Provides radius, line width, fill, and transparency. |
| Draw | A reference to a drawable shape defined elsewhere in the menu. Provides the location. |
| Image | A downloadable bitmapped image. Images are referenced by Img components. The UPE client caches the image for persistent reference. Cached images are purgeable by the UPE server. |
| Img | A reference to a downloaded image. Provides the location and transparency of the image. Multiple Img components can reference the same Image component. |
| Polygon | A definition of a general convex polygonal shape to be drawn on the screen. Provides a set of vertices, line width, fill, and transparency. |
| Rectangle | A definition of a rectangle shape to be drawn on the screen. Provides width, height, line width, fill, corner rounding, and transparency. |
| Sound | A downloadable PCM audio file. Sounds are referenced by Beep components. The UPE client caches the sound for persistent reference. Cached sounds are purgeable by the UPE server. |
| Text | A line of text to be rendered on a frame. Provides a reference to a Font, the location, justification, color and transparency of the text to be displayed. |

Container smart components provide screen elements that contain data and display the data in various ways.

TABLE 8

Container Smart Components

| Component | Description |
| --- | --- |
| Dynamic Text Area | A multi-line text area that can dynamically change based on various attributes. The Dynamic Text Area is based upon Scrollable Text Area, and inherits all of its properties. |
| Popup List | A short, non-scrollable list of items that can be drawn over the current frame. |
| Scrollable List | A list of items that can be scrolled up, down, left, or right. The scrolling direction depends on the visual layout. |
| Scrollable Text Area | A multi-line text area that can be scrolled up or down. A Scrollable Text Area can scroll an arbitrary amount of text. |
| Scrollable Table | A multi-line, multi-column text area. The Scrollable Table is based upon Scrollable Text Area, and inherits all of its properties. |

Navigation smart components express various methods of navigating components of a frame.

TABLE 9

Navigation Smart Components

| Component | Description |
|---|---|
| Auto Browse | Simulates navigation of the UI by pushing updates defining the current in-focus component. |
| History | Keeps track of the order in which a viewer has viewed frames. Used for implementing a back key and tracking utilization of a menu. |
| Display Transitional Graphics | Displays an information message overlaid upon the frame. Used for simple messaging to the viewer. |

VOD Controls smart components provide session management, stream control, asset query and the ability to conduct transactions. The actual behaviors of these components depend on the underlying VOD environment providing the stream.

TABLE 10

VOD Controls Smart Components

| Component | Description |
|---|---|
| Asset Query | A flexible method of querying a VOD environment to determine the assets available for viewing and purchase. Provides access to assets such as content categories, content itself, and meta data. |
| Fast Forward | Quickly scan the content forward in time. |
| Pause | Stops the playing of audio and video while retaining the last frame of video on the screen. |
| Play | Starts playing content or resumes playing previously paused content. |
| Rewind | Quickly scan the content backward in time. |
| Session Management | The ability to create, maintain, and destroy a session between the VOD environment and a particular set-top box. |
| Stop | Stops playing the content. |
| Time Index Mark | Determines the current time index into content in hours, minutes, and seconds. |
| Transactions | A flexible method of recording the purchase of content. |

Data Entry smart components provide the ability to collect data from the viewer.

TABLE 11

Data Entry Smart Components

| Component | Description |
|---|---|
| Address Entry | Provides typical address entry including address (multiple lines), city, state, zip code |
| Credit Card Entry | Provides typical credit card information entry including type, number and expatriation date |
| Form Entry | Provides generic, multi-field data entry. |
| PIN Change | Provides typical PIN changing entry including old PIN, new PIN and verify PIN. |
| PIN Entry | Provides typical PIN entry for collecting a viewers PIN. |
| Text Field Entry | A one-line text entry area. |

The Data Retrieval smart components facilitate the collection and display of data from an existing data store. The data typically originates from a third-party application.

TABLE 12

Data Retrieval Smart Components

| Component | Description |
|---|---|
| Account | Retrieves and displays a viewer's account information. |
| Report | Retrieves an arbitrary report and displays the information in a scrolling text area. |

Transaction smart components provide the basic building blocks for commerce applications.

TABLE 13

Transaction Smart Components

| Component | Description |
|---|---|
| Authentication | Collects and validates a PIN from a viewer. |
| Cancel Order | Allows a viewer to cancel a previously placed order. |
| Cancel Order Confirmation | Confirmation regarding a cancel order request. |

TABLE 13-continued

Transaction Smart Components

| Component | Description |
|---|---|
| Credit Card Preauthorization | Validates and preauthorizes a credit card. |
| Order Capture | A general-purpose mechanism for configuring items to be purchased. |
| Order Confirmation | Confirmation regarding a place order request. |
| Order History | A special report providing a history of past purchase activity. |
| Order Return | Allows a viewer to request to return items from a particular order. |
| Order Tracking | Allows a viewer to track the shipping and handling status of their orders. |
| Shopping Cart | Provides typical shopping cart features. |

Merchandising smart components provide a mechanism to place offers and promotions on a Frame to support various marketing and selling strategies. The Merchandising smart component is complex and provides the following functionality:

TABLE 14

Merchandising Smart Components

| Functionality | Description |
| --- | --- |
| Linked Promotion | A mechanism for presenting promotional information on a Frame. The promotion covers multiple items. |
| Simple Promotion | A mechanism for presenting promotional information on a Frame. The promotion covers one item. |
| Top Assets | A mechanism for presenting a set of promotions containing the most viewed assets. |
| Top Unseen Assets | A mechanism for presenting a set of promotions containing the most viewed assets that the particular viewer has not seen. |
| Billboard | A simple mechanism for placing an advertisement on a Frame. |
| Banner Ad | An advertisement consisting of an Image and a Link to more detailed information. |
| Full Screen Ad | A full screen, full motion video/audio advertisement. |
| Coupon | A special type of advertisement that provides the viewer with a coupon to be redeemed at a later time. |

Adapters

The UPE Server 140 employs an adapter design pattern to enable simple albeit powerful integrations with third-party systems. Simply stated, the adapter design pattern represents a class of object-oriented abstractions that map the interface of one system to another. In particular, UPE Server 140 adapters map Smart Components 130 to third party systems. For example, FIG. 14 depicts a block diagram of a VOD/Adapter Smart Component for facilitating adaptation to a third-party VOD server system provided by SeaChange.

Figure 15:
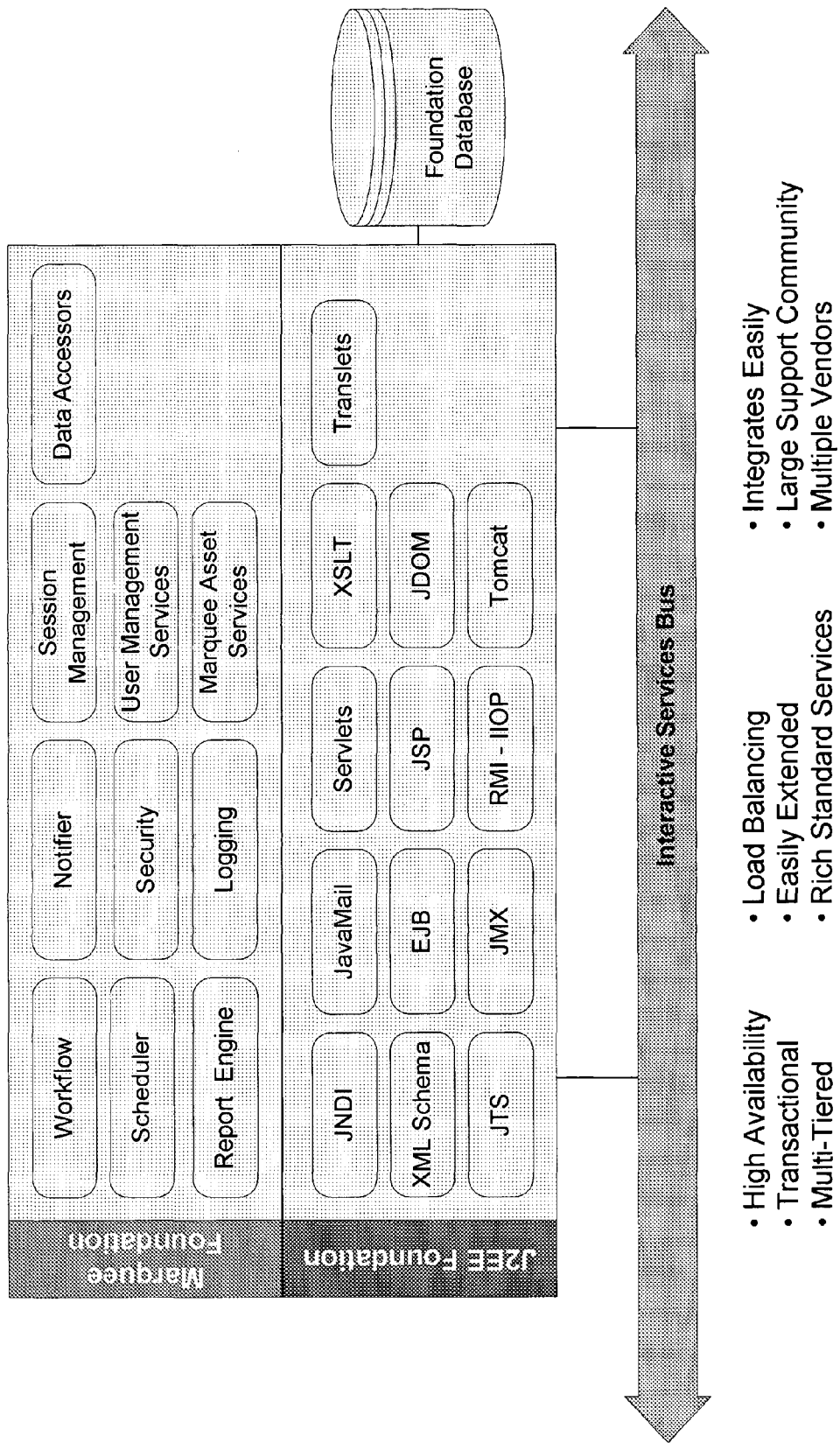
FIG. 15 depicts a block diagram of the Marquee Product Foundation in accordance with the present invention.

FIG. 15 depicts a block diagram of the Marquee Product Foundation in accordance with the present invention. The UPE utilizes XML, and Java technologies, among others, to form the foundation for adapters. The combination of these state-of-the-art technologies provides an adapter foundation that has the depth and breadth to handle integration with third-party systems.

XML is probably one of the most significant standards to be widely adopted by the software development community. Systems designed to take full advantage of the power of XML enjoy significant interoperability. In particular, XML enabled applications interoperate extremely efficiently with other XML enabled systems. Another primary benefit of XML is data portability. Data expressed as an XML document is well-formed and verifiable. Verified XML documents can be easily translated from one form to another. The combination of system interoperability and data portability make XML a powerful enabling technology that normalizes the adapters utilized by the UPE.

XSLT is a language for transforming XML documents into other XML documents or into new types of documents. Adapters utilize XSLT to translate data from a third-party system into a format compatible with the targeted Smart Component 130.

The UPE is programmed using an Object-Oriented programming language such as Java. Java shares many of the basic qualities of XML, namely interoperability and portability. This close relationship makes Java an excellent environment to develop XML enabled applications. Many of the mundane tasks of dealing with XML (e.g., parsing, generating, marshalling, un-marshalling, etc.) are well supported by Java itself, open source initiatives, and commercially available products. UPE employs the following Java/XML technologies: JDOM, Apache Xerces, and JNI. It will be appreciated by those skilled in the art that the present invention is not limited to using such technologies.

JDOM is a Java representation of an XML document. JDOM provides a way to represent that document for easy and efficient reading, manipulation, and writing. More information about JDOM can be found at http://www.jdom.org.

Xerces Java Parser is an open source XML toolkit supporting XML manipulation in Java and various methods of parsing XML documents. The UPE utilizes the SAX parser that is part of Xerces. More information about Xerces can be found at http://xml.apache.org.

Java Native Interface (JNI) is used as the method to integrate with legacy systems that do not employ XML as a method of data exchange. Adapters utilizing JNI can invoke methods in various forms of executable code supported by the target environment, namely COM, DLLs and shared libraries.

VOD Adapters represent a special type of adapter utilized by the UPE Server 140. The VOD Adapter provides a standard interface to a VOD environment that provides access to typical services including session management, stream control, asset queries, and transaction management. The VOD Adapters leverage a set of foundation objects, providing well-defined access to standard streaming protocols.

The UPE Server VOD Adapter foundation supports the following standard VOD interfaces: DSM-CC for session management; Lightweight Stream Control (LSC) Protocol for stream control; and, RTSP for session management and stream control. The system provides UPE Server VOD Adapters for the majority of VOD environments including ones provided by: SeaChange, Concurrent, and nCube. The VOD Adapters interoperate with STBs 190 such as those provided by Scientific-Atlanta and Motorola.

Data adapters are the general category of adapters used by the Smart Components 130. The UPE supports various flavors of these adapters; the most utilized are detailed below.

The XML-to-XML adapters provide a deterministic translation between the source and target documents via XLST. They are simple JDOM wrappers for XML documents. JDOM provides a simple Java interface to XML data, making it easy to manipulate data from any system. This is the most efficient means of adapting to third party systems.

Third-party systems running on Microsoft Windows® typically utilize the Common Object Model (COM) to componentize their external interfaces. COM is one of the most widely used component software models in the world, allowing the UPE to adapt to third-party systems. Java provides a robust set of abstractions for adapting COM objects.

Other third-party systems utilize Dynamic Link Libraries (Windows®) or shared libraries (UNIX) as the primary means of interfacing with other systems. The UPE Server 140 employs the JNI to access these types of interfaces.

The following Glossary is intended to supplement the above disclosure.

GLOSSARY

API—Application Programming Interface; a document for programmers that provides the technical specifications for interfacing with an application from another program.

ATM—Asynchronous Transfer Mode—A network technology based on transferring data in cells or packets of a fixed size.

Back Channel—The physical way that the STB is able to send information/requests/demands back to the head-end. A back channel is usually a 2-way communications link between the STB and the head-end. The back channel is often of much lower bandwidth than is a front channel.

BMP—Bitmap—An image stored as pixels mapped across the screen.

CBR—Constant Bit Rate—Constant bit rate means that a bit stream (compressed or uncompressed) has the same number of bits each second.

CD—Compact Disc—A 13 centimeter laser-encoded optical memory storage medium based on standards owned by Philips and Sony. CDs contain up to 650 MB of data. Since the original music coding standards, other standards have been developed for data storage such as the CD-ROM, CD-I (a Philips interactive CD standard), etc.

Churn—The propensity of subscribers of a network operator or content provider, such as cable or satellite TV, to stop taking that service because they're moving, can no longer afford it, etc.

Class—(1) An object in an object-oriented programming language. (2) A set of objects that share a common structure and behavior. (3) A Java program.

Class Library—A number of reusable classes for use with an object-oriented programming system.

CMS—Content Management System. The computerized management of electronic information providing the ability to manage the processes of aggregating and distributing content.

COM—Common Object Model—Allows software modules (software modules are integral parts of a software programs) to be written without information about each other except an interface to work together as a single application.

Content Provider—The entity that creates or aggregates the content viewers watch.

Demographics—The characteristics of an audience or market, usually expressed in terms of age, spending patterns, race, sex, income, etc.

DSM-CC—Digital Storage Media Command and Control—An MPEG standard that defines connection control and interfaces for STBs, VOD servers, and networks to provide such client/server operations as service navigation, video stream control, file access, and database access.

DVD—Digital Versatile Disk (Previously called Digital Video Disc)—A type of disc that holds a minimum of 4.7 GB (gigabytes), more than enough for a full-length movie. The DVD specification supports disks with capacities from 4.7 GB to 17 GB and access rates of 600 Kbps to 1.3 Mbps.

Easter Egg—Part(s) of the DVD that contain a link, or links, to additional content. The viewer might never know it's there and it may have been added clandestinely by a content designer.

EPG—Electronic Program Guide—An on-screen guide that allows viewers to review and select the large number of channels, Pay Per View events, and shows available particularly in a digital environment.

Fps—Frames per second.

GOP—Group of Pictures—In MPEG video, one or more I-frames followed by P-frames and B-frames. A GOP is the atomic unit of MPEG video sequences.

Grooming—The process of altering and augmenting DVD content to be delivered over a network infrastructure. Grooming includes association with an on-demand portal, navigational optimization, branding, associating intro, pause, and exit offers, and associating related merchandising.

HDTV—High Definition TV—A high-resolution TV standard based on MPEG.

Head-End (or Head end)—For a cable operator, the Head-End is the system which receives, processes and transmits television signals to cable subscribers. In an online network environment, the Head-End is generally a network or service provider's computer system and databases.

HFC—Hybrid Fiber Coax—A type of network having a hybrid of coaxial and fiber optic cables.

HTML—Hypertext Markup Language—The tag-based ASCII language used to create pages on the World Wide Web.

I frame—One of the three types of frames that are used in MPEG-2 coded signals. The other two are B frames and P frames. It is MPEG-2 still pictures.

Ingestion—The process of converting a DVD title into a set of data capable of being delivered on-demand over a broadband network.

Java—An Object-Oriented programming language created by Sun Microsystems. Java is a device independent language, meaning that programs compiled in Java can be run on any computer. Java programs can be run as a free-standing application or as an applet placed on a web page.

Java Bean—Java Beans are an Application Programming Interface (API) for reusable Java-based components.

JPEG—Joint Photographic Experts Group—A standard for compressing still images.

Metadata—Information about the audio and/or video data that's included in the signal's data stream. It can be considered data about the data itself.

MPEG—Motion Picture Experts Group—Digital video compression standards and file formats formulated by the Motion Picture Experts Group, an international group of industry experts which aim was to standardize compressed moving pictures and audio. MPEG 1, 2, 4, and 7 have been defined.

NCTA—National Cable and Telecommunications Association—The American cable industry's major trade association.

NTSC—National Television System Committee—The NTSC is responsible for setting television and video standards in the United States. The NTSC standard for television defines a video signal with a refresh rate of 60 half-frames (interlaced) per second. Each frame contains 525 lines (which includes the VBI lines) and can contain 16 million different colors.

PAL—Phase Alternate Line. A video standard used in Europe and other parts of the world for composite color encoding.

PCB—Presentation Control Block—In DVD-Video, contains references to groups of cells.

PG—In DVD-Video, a Program.

PGC—Program Chain—In DVD-Video, a collection of programs, or groups of cells, linked together to create a sequential presentation.

PGCI—Program Chain Information—The PGC data structure.

PID—Packet Identifier—The "identifier" (name) for packets being transported in MPEG-2 and other appropriate data streams.

Pixel—Picture element, the digital representation of the smallest area of a TV picture that's capable of being manipulated by the signal (bit stream.) Each pixel is composed of 3 phosphors, one green, one red and one blue.

P frames—One of the three types of frames used in the compressed (coded) MPEG-2 signal.

Portal—A series of interconnected menus allowing a viewer to find relevant content.

Pruning—The process of eliminating parts of a DVD that are not to be delivered on-demand.

RTSP—Real Time Streaming Protocol—RTSP (RFC2326) is a client-server multimedia presentation control protocol, designed to address the needs for efficient delivery of streamed multimedia over IP networks.

SECAM—Sequential Couleur Avec Memoire—A video broadcast standard developed in France.

STB—Set-top Box—A device that is capable of decoding MPEG.

Transcode—Transferring one file format to another without recompressing the data.

VBR—Variable Bit Rate—Variable bit rate means that a bit stream (compressed or uncompressed) has a changing number of bits each second. Simple scenes can be assigned a low bit rate, with complex scenes using a higher bit rate. This enables maintaining the audio and video quality at a more consistent level.

VMG—Video Manager—In DVD-Video, the disc menu. Also called the title selection menu.

VMGI—The VMG data structure.

VOB—Video Object—In DVD-Video, a small unit of data storage, usually a GOP. Also, the container file for all DVD-Video data structures.

VOBS—Video Object Set—In DVD-Video, a collection of VOBs, represented by a .VOB file.

VOBU—Video Object Unit—In DVD-Video, a VOBU is the smallest unit of playback. A VOBU contains 0 or more of any of the following: navigation pack (required, 1 only), video pack, audio pack, or subpicture pack.

VOD—Video on Demand—A video delivery system that allows the viewer to select movies or other content that they wish to view from a large selection of titles and categories stored on a remote server. The service may also provide VCR functionality (e.g., play, stop, pause, rewind, and fast forward), which allows the viewer to control the "play back" of the server from the remote control.

VTS—Video Title Set—In DVD-Video, a set of one to ten files holding the contents of a title.

VTSI—Video Title Set Information—The VTS data structure.

XML—Extensible Markup Language—Part of SGML or Standard Generalized Markup Language which is a platform-independent format for creating documents.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as exemplary embodiments. Various changes may be made in the shape, size, and arrangement of parts. For example, equivalent elements or materials may be substitute for those illustrated and described herein, and certain features of the invention may be utilized independently of the use of other features, all as would be apparent to one skilled in the art after having the benefit of this description of the invention.

What is claimed is:

1. A method for converting DVD content into a project suitable to be delivered via a network, said method comprising the steps of:

in a DVD conversion system comprising a software system running on a computer:
  extracting contents of a DVD into information files and video object files, wherein the extracting includes demultiplexing the video object files into demultiplexed data files, and reorganizing the demultiplexed data files into a hierarchical structure of folders and files;
  translating said extracted information files into XML format;
  transcoding said extracted video object files from variable bit rate format to constant bit rate format;
  bundling said translated and transcoded files into the project; and
  pruning at least one feature from the project.

2. The method as claimed in claim 1, further comprising the step of:
  decrypting data stored on the DVD.

3. The method as claimed in claim 1, further comprising the step of:
  associating the project with a target user interface.

4. The method as claimed in claim 1, further comprising the step of:
  importing the project to associate the project with existing menu frames.

5. The method as claimed in claim 1, wherein the at least one feature is any of presenting the DVD content in a widescreen version, presenting the DVD content in multiple languages, a widescreen chapter index, a sub-picture, and bonus content.

6. The method as claimed in claim 1, further comprising the step of:
  editing said project in order to add at least one feature which is to be delivered via the network.

7. The method as claimed in claim 6, wherein the feature is at least one of navigational optimization, a tie in to an on-demand portal, key-mapping, button highlighting, intra-menu navigation, inter-menu navigation, DVD disc merge.

8. The method as claimed in claim 6, wherein the feature is displaying one or more brands or advertisements.

9. The method as claimed in claim 8, wherein the one or more advertisements comprise an offer to be presented upon pause of the DVD content.

10. The method as claimed in claim 8, wherein the one or more advertisements comprise an offer to be presented upon exiting the DVD content.

11. The method as claimed in claim 8, wherein the one or more advertisements comprise an offer for merchandise or to view additional content.

12. The method as claimed in claim 6, wherein the feature is compatibility with a network operator or content provider.

13. The method as claimed in claim 1, further comprising the step of:
  displaying the converted content in an emulated set-top box environment.

14. The method as claimed in claim 1, further comprising the step of:
  validating the video quality of the project.

* * * * *